United States Patent
Aihara et al.

(10) Patent No.: US 7,041,945 B2
(45) Date of Patent: May 9, 2006

(54) INDUCTION HEATER FOR COOKING

(75) Inventors: Katsuyuki Aihara, Akashi (JP); Hirofumi Nakakura, Toyonaka (JP); Kazuichi Okada, Kobe (JP); Kouichi Hosoi, Kobe (JP); Shigezou Oonishi, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 154 days.

(21) Appl. No.: 10/148,609

(22) PCT Filed: Dec. 1, 2000

(86) PCT No.: PCT/JP00/08566

§ 371 (c)(1),
(2), (4) Date: Mar. 4, 2003

(87) PCT Pub. No.: WO01/41510

PCT Pub. Date: Jun. 7, 2001

(65) Prior Publication Data

US 2003/0164370 A1 Sep. 4, 2003

(30) Foreign Application Priority Data

| | | |
|---|---|---|
| Dec. 2, 1999 | (JP) | 11-343071 |
| Apr. 13, 2000 | (JP) | 2000-111767 |
| Apr. 13, 2000 | (JP) | 2000-111768 |
| May 17, 2000 | (JP) | 2000-145180 |
| Jun. 6, 2000 | (JP) | 2000-168554 |

(51) Int. Cl.
*H05B 6/12* (2006.01)

(52) U.S. Cl. ............... 219/622; 219/620; 219/621; 219/625; 219/627; 219/624; 219/506; 219/445.1

(58) Field of Classification Search .............. 219/622, 219/620, 621, 625, 627, 624, 506, 445.1
See application file for complete search history.

(56) References Cited

U.S. PATENT DOCUMENTS 5,013,893 A * 5/1991 Goessler et al. ......... 219/445.1

FOREIGN PATENT DOCUMENTS

| JP | 56-71291 | 6/1981 |
|---|---|---|
| JP | 64-24386 | 1/1989 |
| JP | 64-63290 | 3/1989 |
| JP | 03-289086 | 12/1991 |
| JP | 5-14302 | 4/1993 |
| JP | 07-312279 | 11/1995 |
| JP | 07-312280 | 11/1995 |
| JP | 7312279 | * 11/1995 |
| JP | 7312280 | * 11/1995 |
| JP | 11-087033 | 3/1999 |

* cited by examiner

*Primary Examiner*—Shawntina T. Fuqua
(74) *Attorney, Agent, or Firm*—Snell & Wilmer L.L.P.

(57) ABSTRACT

An induction-heating cooking device includes a light-transmissive cooking board on which a cooking container to be heated is to be placed; a heating coil for heating the cooking container; light emission means for emitting a light beam; and light-transmissive light conducting means for allowing the light beam emitted by the light emission means to be propagated therethrough. The light beam lights up an outer peripheral portion of the light conducting means.

10 Claims, 32 Drawing Sheets

FIG. 2
(a)
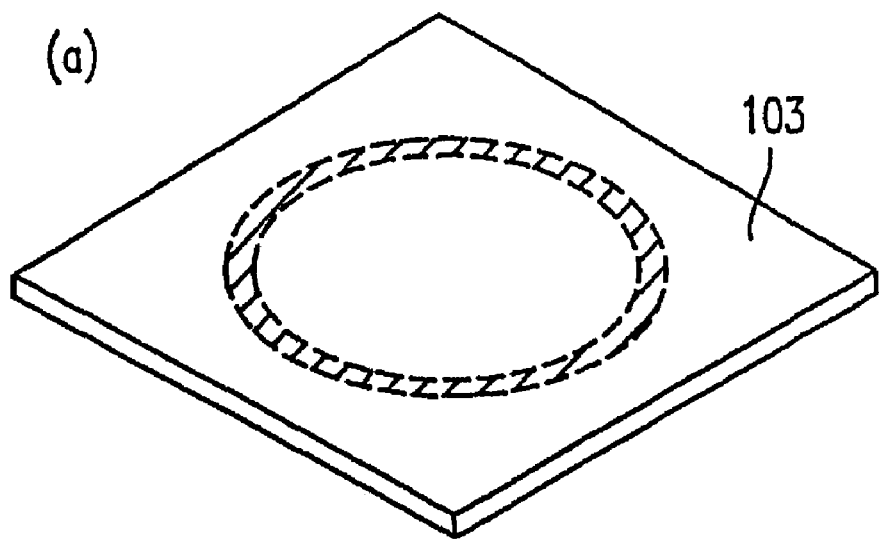
(b)
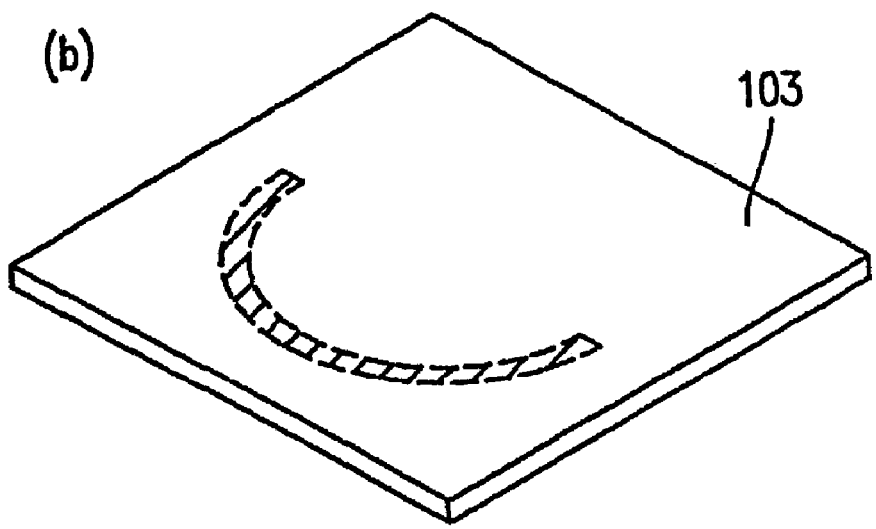
(c)
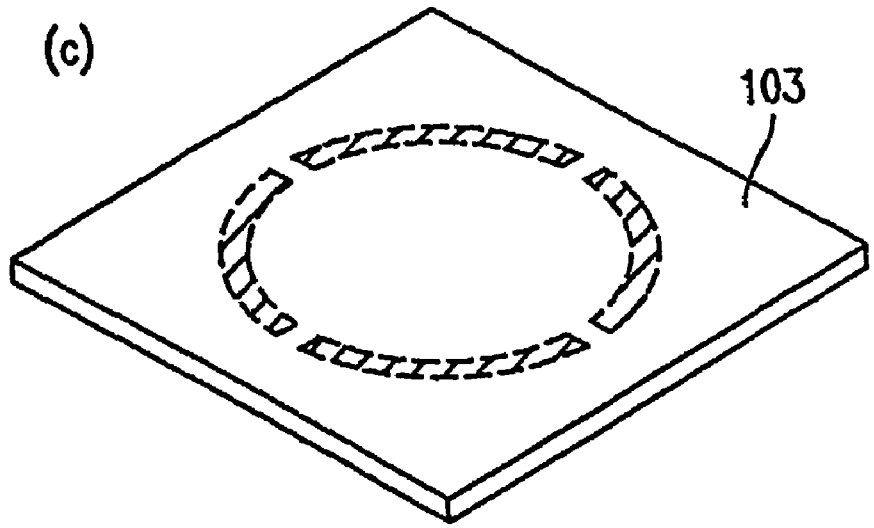

FIG. 9
(a)
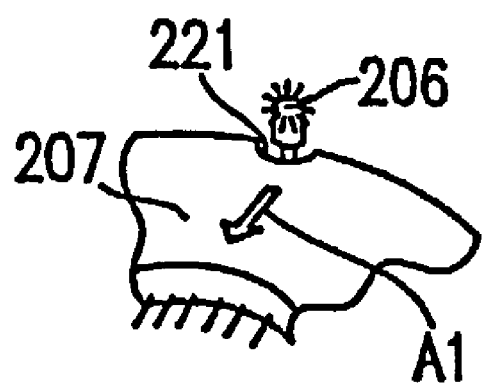
(b)
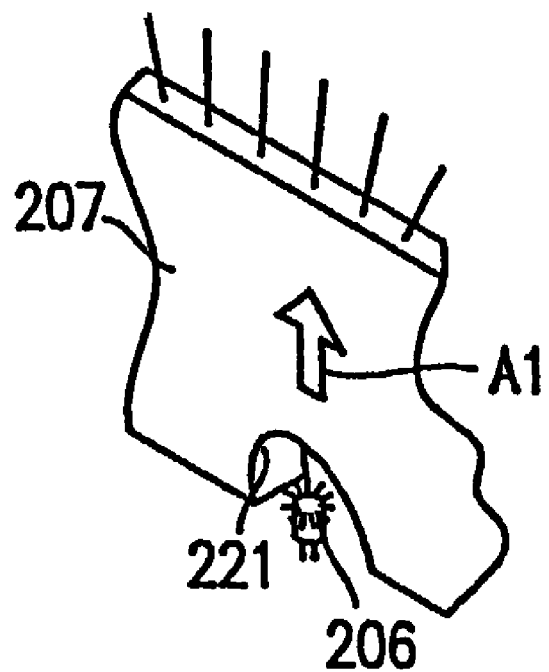

FIG. 14
(a)
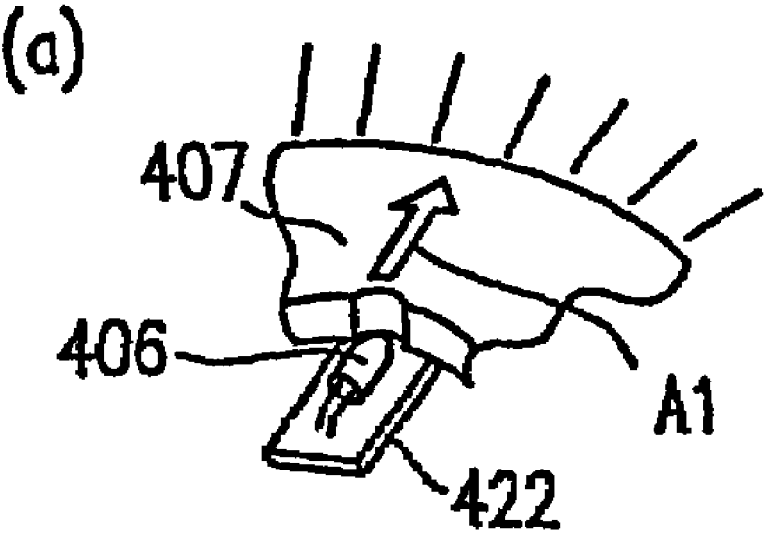
(b)
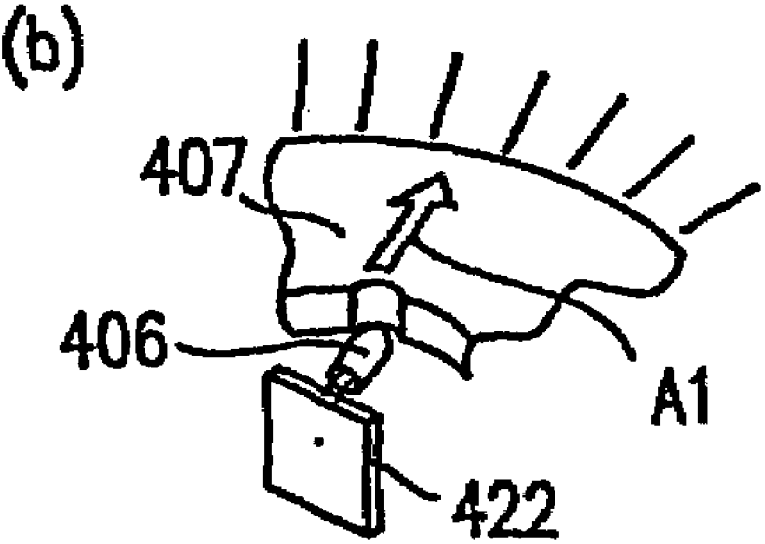

FIG. 29
(a)
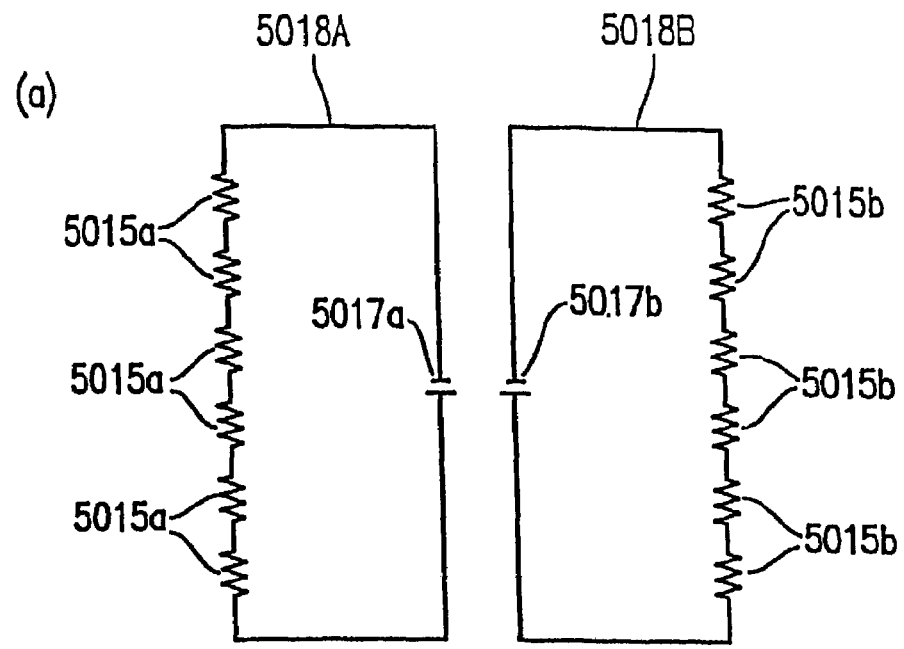
(b)
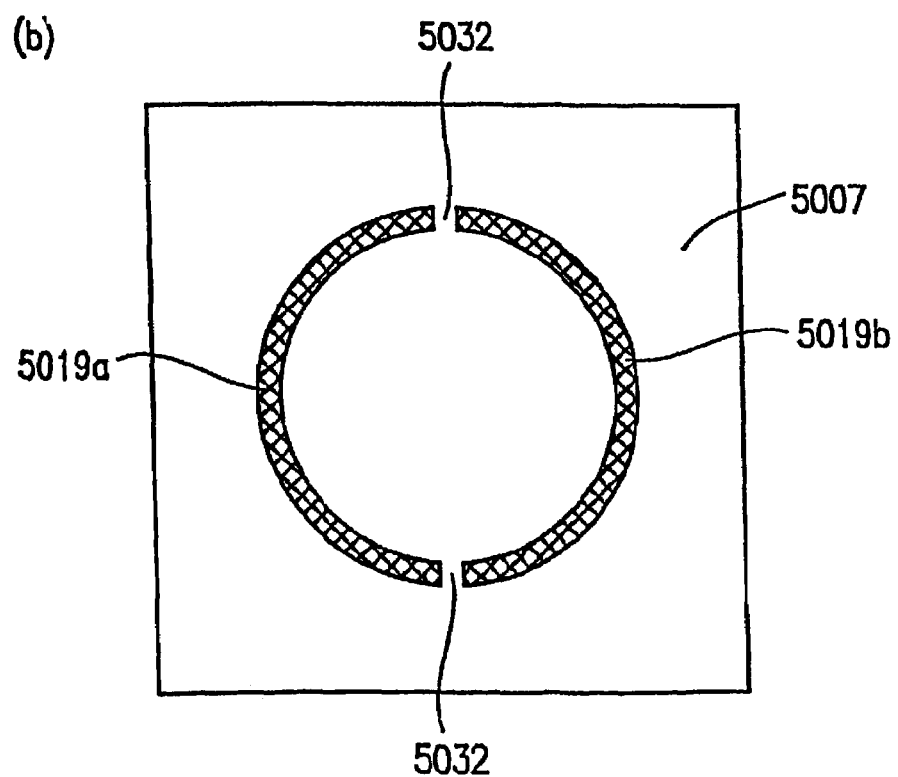

FIG. 35
(a)
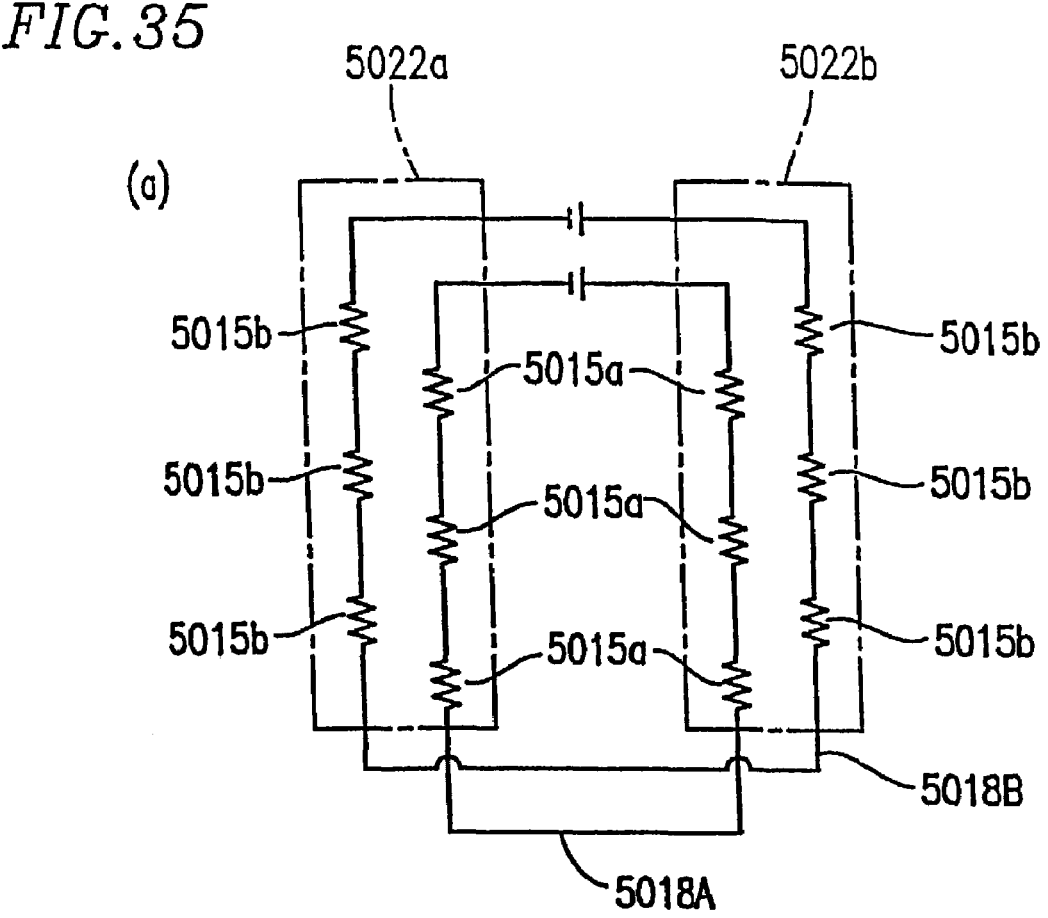
(b)
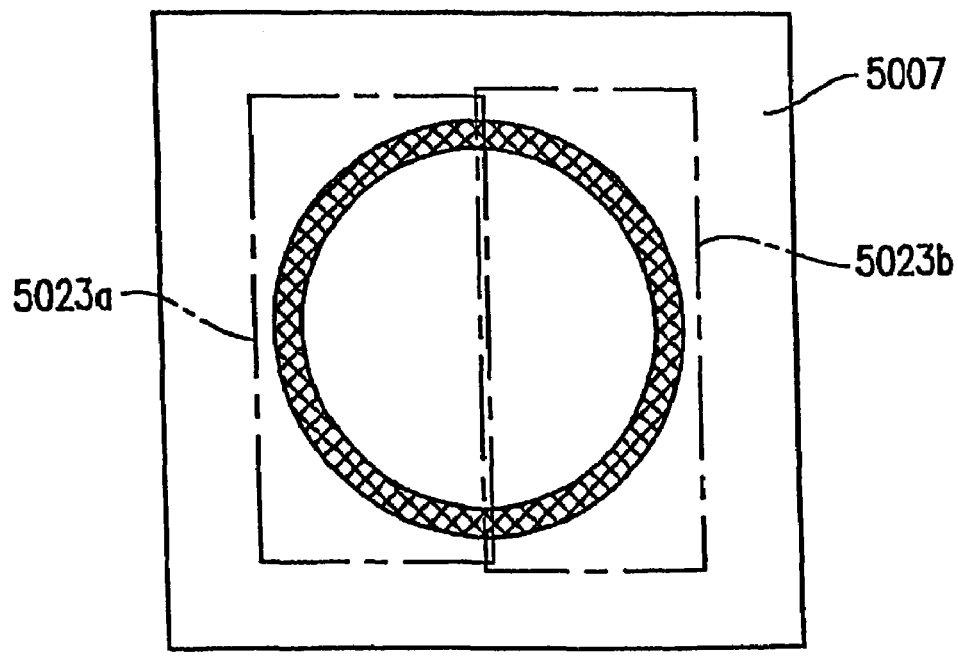

INDUCTION HEATER FOR COOKING

TECHNICAL FIELD

The present invention relates to an induction-heating cooking device used in general households.

BACKGROUND ART

Recently, an induction-heating cooking device is a target of attention as a safe heating cooking device. Conventionally, this type of induction-heating cooking device generally represents its heating state with a display section, which is provided in the vicinity of an output setting section and lit up with, for example, a light bulb or a semiconductor device. Some built-in type induction-heating cooking devices, in which the output setting section and the cooking section are visually separated from each other, have another similar display section on a front part of the cooking section. Hereinafter, a structure of a conventional induction-heating cooking device 3600 will be described with reference to FIG. 36.

As shown in FIG. 36, the induction-heating cooking device 3600 includes a case 6001 forming a main body, a cooking board 6003 on which a cooking container 6002 to be heated is to be placed, a heating coil 6004 located below the cooking board 6003, a temperature sensor 6005 for sensing the temperature of the cooking container 6002, an output control section 6006 for controlling an output of the heating coil 6004, a ventilator 6007 for cooling the output control section 6006, a power switch 6008 for turning on/off the power, a power display section 6009 for displaying the on/off state of the power switch 6008, an output setting section 6010 for setting the output, an output display section 6011 for displaying the setting state of the output, a second output display section 6012 located in a front area of the cooking board 6003, and a heating state display section 6013 for displaying the heating state.

The induction-heating cooking device having the above-described structure operates as follows. When the power switch 6008 is turned on, the power display section 6009 is lit up so as to display the on/off state of the power switch. When the cooking container 6002 accommodating food to be cooked is placed on the cooking board 6003 and the output setting section 6010 is turned on, the output display section 6011 is lit up so as to display the setting state of the output and also start heating. Simultaneously, the second output display section 6012 is lit up so as to display the setting state of the output. In accordance with the temperature sensed by the temperature sensor 6005, the heating state display section 6013 is lit up so as to display the heating state.

Conventionally, this type of induction-heating cooking device does not generate a flame and have a high thermal efficiency, unlike a gas cooking stove. Therefore, the demand for this type of induction-heating cooking device is increasing. FIG. 37 is an isometric view of a conventional, general induction-heating cooking device 3700. In FIG. 37, reference numeral 6101 represents a main body case, reference numeral 6102 represents a cooking board on which a cooking container to be heated is to be placed, reference numerals 6103 and 6104 represent heating sections using induction heating of the same rated outputs and corresponding to heating coils (not shown) provided below the cooking board 6102. Reference numeral 6105 represents a radiation heater used for heating an aluminum pan or a copper pan which cannot be heated by induction heating.

For performing induction-heating cooking using the induction-heating cooking device 3700 having the above-described structure, a cooking container which can be induction-heated is placed on the heating section 6103 or 6104 of the cooking board and the power is turned on.

An induction-heating cooking device performs cooking as follows. A high frequency electric current is caused to flow to a heating coil so as to generate a high frequency magnetic field. A Joule heat by an eddy current is generated in a pan (load) which is magnetically coupled to the heating coil, so as to heat the pan itself. Therefore, there is a problem in that the user cannot easily recognize the heating state visually, unlike with a gas cooking device generating a flame or an electric heater in which the heating section is heated red.

In order to solve this problem, for example, an induction-heating cooking device described in Japanese Patent No. 2903561 is proposed. With reference to FIG. 38, a conventional induction-heating cooking device 3800 will be described. As shown in FIG. 38, the induction-heating cooking device 3800 includes a heating coil 6202 for heating a pan located below a cooking board 6201 by induction heating, and light bulbs 6203 provided in the vicinity of the heating coil 6202. Japanese Patent No. 2903561 discloses that (i) simultaneously with a heating operation, the light bulbs 6203 provided in the vicinity of the heating coil 6202 are lit up so as to display a heating area; and (ii) when a substance which generates light when receiving light is caused to adhere to a bottom surface of an iron plate provided on a top surface of the main body, a pan is put in place and a heating operation is started, the light bulb 6203 provided at the center of the heating coil emits light; and upon receiving the light, the substance secondarily emits light, resulting in a circle 6204 as shown in FIG. 39 being displayed on the cooking board.

Japanese Laid-Open Publication No. 7-312279 describes the following. A plurality of light emitting diodes for displaying the heating state are provided along an outer periphery of the heating coil, and a light emitting diode for displaying the heating power is provided in the vicinity of and outside the plurality of light emitting diodes. When the heating coil is electrically conducted so as to be heated, the light emitting diodes for displaying the heating state are lit up. Thus, the heating state is notified. The light emitting diode provided in the vicinity thereof for displaying the heating is lit up. Thus, the heating power is clearly indicated.

With reference to FIG. 40, an induction-heating cooking device 4000 includes a heating coil 6302 for heating a pan provided below a cooking board 6301 by induction heating, and light bulbs 6303 provided in the vicinity of the heating coil 6302. Simultaneously with a heating operation, the light bulbs 6303 provided in the vicinity of the heating coil 6302 are lit up so as to display heating area.

With reference to FIG. 41, it is proposed to provide, below the heating coil, a circularly annular conductor 6304 formed by assembling a plurality of blocks, each including a conductor piece 6304a and a light source 6305. According to this structure, the plurality of light sources 6305 are provided at the center of the circularly annular conductor. When the heating coil is electrically conducted to be heated, the light sources 6305 are lit up along an outer periphery of the circularly annular conductors 6304. In this manner, the heating state is indicated.

According to the conventional method, as shown in FIG. 36, of displaying the heating state of the induction-heating cooking device 3600, the section for actually performing cooking and the section for displaying are visually separated from each other. Therefore, it is difficult for the user to visually recognize the heating state.

The induction-heating cooking device, which outputs invisible alternate magnetic fluxes, has a specific problem of being difficult to handle since it is difficult for the user to visually recognize the heating state, unlike with a gas cooking device generating a visible flame.

With induction-heating cooking devices, the user cannot visually recognize the heating state. Therefore, for safety, heating is generally started after the power is turned on, a cooking container is placed on the cooking board, and the heating power is set. As described with reference to the conventional examples, various methods have been proposed for allowing the user to visually recognize whether heating is performed or not. However, the on/off state of the power has not been much considered. Even when the cooking container is placed on the cooking board, it is not shown whether the power is on or off. Therefore, the user needs to check with the power display section each time. However, the power display section is small and far from the heating section for heating the cooking container. Thus, it is troublesome to check from time to time when the user is busy or continuously cooking.

The plurality of heating sections in the conventional induction-heating cooking device 3700 shown in FIG. 37 all use the heating coils of the same rating. For example, in FIG. 37, there are two heating sections (the heating sections 6103 and 6104). The heating coils corresponding to them both have a rated output of 2 kW.

As a wider variety of foods have become cooked in a wider variety of manners recently, there is a demand for heating sections having different outputs, especially large outputs. The present invention provides an induction-heating cooking device including heating coils having different ratings, i.e., heating sections having different inputs and outputs.

Even if the heating sections have different outputs, the difference cannot be represented with an induction-heating cooking device. In conventional induction-heating cooking devices, it does not matter which one of the heating sections is used for which cooking container. This is true when cooking containers are placed on both the heating sections, or even when one cooking container is placed on one of the heating sections.

When the heating sections have different outputs, a wrong selection of the heating section results in the cooking time being different from the expected time or the cooking being finished in a poor state due to an excessive temperature rise.

The conventional induction-heating cooking device 3800 shown in FIG. 38 includes light emitting means, for example, light bulbs 6203 in the vicinity of the heating coils 6202. This structure requires a plurality of light bulbs for displaying the heating sections corresponding to the heating coils 6202. When the number of light bulbs is limited, the heating section is difficult to see since the display is provided by dots.

A display method utilizing secondary light emission, which allows geometrical figures, such as circles, to be drawn relatively easily, has not been put into practice due to the following problems: (i) the display is faint and difficult to see due to the poor efficiency of the secondary light emission; (ii) a clear geometrical figure is difficult to draw due to the directivity or attaching dispersion of the light bulb 6203 used for light emission which are provided at the center of the heating coil; and (iii) the stability is poor since the secondary light emitting substance is provided below the cooking board 6201 having a high temperature.

The structures shown in FIGS. 40 and 41 both use a plurality of light sources. The structure is a one-system structure in which all the plurality of light sources are connected in series. Therefore, if even a part thereof malfunctions, the entire system remains unlit, which prevents the user from visually recognizing the heating section.

The pattern is limited to two: (i) lighting-up and (ii) blinking. Thus, it is impossible to provide various manners of display.

An objective of the present invention is to provide a highly safe induction-heating cooking device having an improved ease of handling by allowing a heating state to be displayed in a similar manner to that of a gas cooking device.

Another aspect of the present invention is to provide an induction-heating cooking device which allows the on/off state of the power to be easily checked and also allows whether the heating is performed or not to be easily checked.

Still another aspect of the present invention is to provide an induction-heating cooking device which allows a difference in outputs to be recognized with a simple structure.

Still another aspect of the present invention is to provide an induction-heating cooking device which can clearly display the heating area and its vicinity of the heating section corresponding to the heating coil with a small number of light sources.

Still another aspect of the present invention is to provide an induction-heating cooking device which allows the heating section to be visually recognized by preventing the entirety of a heating section from failing lighting up even if a part of the heating section malfunctions, and which allows various patterns to be provided.

DISCLOSURE OF THE INVENTION

An induction-heating cooking device according to the present invention includes a light-transmissive cooking board on which a cooking container to be heated is to be placed; a heating coil for heating the cooking container; light emission means for emitting a light beam; and light-transmissive light conducting means for allowing the light beam emitted by the light emission means to be propagated therethrough. The light beam lights up an outer peripheral portion of the light conducting means. Thus, the above-described objectives are achieved.

The light emission means and the light conducting means may be provided oppositely to each other with respect to the heating coil.

The light conducting means may be disc-shaped. The light conducting means may have an opening at a center thereof. The light emission means may be provided in the opening.

The light conducting means may have a thickness which decreases from an inner portion to an outer portion. The light conducting means may have a top surface and a bottom surface. The induction-heating cooking device may further include reflection means provided on at least the top surface and the bottom surface for reflecting the light beam.

The light conducting means may have an illumination surface formed at an outer peripheral end of the light conducting means for reflecting the light beam toward the cooking board.

The induction-heating cooking device may further include reflection means provided parallel to the illumination surface for reflecting the light beam toward the cooking board.

The light conducting means may further have a wall formed on the side of the cooking board with respect to the illumination surface for guiding the light beam toward the cooking board. The wall may have a top surface facing the cooking board. The top surface may have display means provided thereon for randomly reflecting or diffusing the light beam.

Another induction-heating cooking device according to the present invention includes a light-transmissive cooking board on which a cooking container to be heated is to be placed; a heating coil for heating the cooking container; light emission means for emitting a light beam; and light-transmissive light conducting means for allowing the light beam emitted by the light emission means to be propagated therethrough. The light conducting means is formed on a border section on which the light beam emitted by the light emission means is incident, and has a concave surface facing the light emission means. Thus, the above-described objectives are achieved.

Still another induction-heating cooking device according to the present invention includes a light-transmissive cooking board on which a cooking container to be heated is to be placed; a heating coil for heating the cooking container; a coil base for fixing the heating coil; light emission means for emitting a light beam; and light-transmissive light conducting means for allowing the light beam emitted by the light emission means to be propagated therethrough. The light conducting means is fixed on the coil base. Thus, the above-described objectives are achieved.

Still another induction-heating cooking device according to the present invention includes a light-transmissive cooking board on which a cooking container to be heated is to be placed; a heating coil for heating the cooking container; light emission means for emitting a light beam; and light-transmissive light conducting means for allowing the light beam emitted by the light emission means to be propagated therethrough. The heating coil is fixed on the light conducting means. Thus, the above-described objectives are achieved.

Still another induction-heating cooking device according to the present invention includes a light-transmissive cooking board on which a cooking container to be heated is to be placed; a heating coil for heating the cooking container; light emission means for emitting a light beam; and light-transmissive light conducting means for allowing the light beam emitted by the light emission means to be propagated therethrough. The light emission means is fixed on the light conducting means. Thus, the above-described objectives are achieved.

The induction-heating cooking device may further include a coil base for fixing the heating coil.

Still another induction-heating cooking device according to the present invention includes a light-transmissive cooking board on which a cooking container to be heated is to be placed; a heating coil for heating the cooking container; output control means for controlling an output of the heating coil; ventilation means for generating a cooling air for cooling the output control means; light emission means for emitting a light beam; and light-transmissive light conducting means for allowing the light beam emitted by the light emission means to be propagated therethrough. The cooling air cools the light emission means and the light conducting means. Thus, the above-described objectives are achieved.

The cooling air may cool the light emission means and the light conducting means after cooling the output control means.

Still another induction-heating cooking device according to the present invention includes a light-transmissive cooking board on which a cooking container to be heated is to be placed; a heating coil for heating the cooking container; a plurality of light emission means for emitting a light beam; and light-transmissive light conducting means for allowing the light beam emitted by the plurality of light emission means to be propagated therethrough. The light conducting means includes light conducting blocks corresponding to the plurality of light emission means. Thus, the above-described objectives are achieved.

Still another induction-heating cooking device according to the present invention includes a light-transmissive cooking board on which a cooking container to be heated is to be placed; at least one heating section provided on the cooking board for heating the cooking container by induction heating; a heating coil provided oppositely to the cooking container with respect to the cooking board, the heating coil being provided in correspondence with the heating section; display means for displaying a use state of the heating section; and control means for controlling the display means. The control means displays the use state in the vicinity of the heating section by the display means when power is turned on. Thus, the above-described objectives are achieved.

The control means may change a form of a display in the vicinity of the heating section when the cooking container is placed and heated by the heating coil.

When an output is not set for a prescribed time period after the power is turned on, the control means may turn the power off.

The induction-heating cooking device may include a plurality of heating sections. When an output is not set for at least one of the heating sections for a prescribed time period after the power is turned on, the control means may delete a display corresponding to the heating section for which the output is not set.

The induction-heating cooking device may include a plurality of heating sections. When the power is turned on, a use state of at least one of the heating sections may be displayed in the vicinity of the at least one of the heating sections.

The control means may change the form of the display in the vicinity of the heating section from blinking to lighting-up.

The control means may change a color of the display in the vicinity of the heating section.

Still another induction-heating cooking device according to the present invention includes a plurality of heating sections provided on a cooking board for heating a cooking container placed thereon by induction heating; a plurality of heating coils having different outputs provided oppositely to the cooking container with respect to the cooking board, the plurality of heating coils being provided in correspondence with the plurality of heating sections; and light emission means for emitting a light beam. The light emission means displays graphic patterns on the cooking board for allowing a difference in the outputs of the heating coils to be visually recognized. Thus, the above-described objectives are achieved.

The outputs may include a rated output.

The outputs may include a set output.

The difference in the outputs may be represented by a difference in size of the graphic patterns.

The difference in the outputs may be represented by a difference in width of the graphic patterns.

The difference in the outputs may be represented by a difference in number of the graphic patterns.

When the difference in the outputs is represented by a difference in number of similar graphic patterns, one of the heating section may be represented by a single graphic pattern and the other heating section may be represented by at least two similar graphic patterns.

The difference in the outputs may be represented by at least one of a difference in color of the graphic patterns or a difference in color darkness of the graphic patterns.

The difference in the outputs may be represented by at least one of a dot, a straight line, or a polygon.

There may be two heating coils. The light emission means may display a graphic pattern for at least one of the heating coils on the cooking board so as to allow a difference in the outputs of the heating coils to be visually recognized.

The light emission means may emit light during cooking, and blinks the light after the cooking is finished until a temperature of the cooking board decreases to a safe level.

Still another induction-heating cooking device according to the present invention includes a light-transmissive cooking board provided on a top surface of a main body case; a heating section provided on the cooking board for heating a cooking container placed thereon by induction heating; a heating coil provided oppositely to the cooking container with respect to the cooking board, the heating coil being provided in correspondence with the heating section; a light conducting body provided at a position corresponding to an outer peripheral portion of the heating coil; and a light source for emitting a light beam toward the light conducting body. The light conducting body receives the light beam emitted by the light source and outputs the light beam from a position corresponding to at least a part of the outer peripheral portion of the heating coil toward the cooking board. Thus, the above-described objectives are achieved.

The light conducting body may have a top surface formed so as to face the cooking board and a bottom surface formed oppositely to the cooking board with respect to the top surface. The bottom surface may have an inclination formed such that a distance between the top surface and the bottom surface decreases in a direction away from the light source.

The light conducting body may have a random reflective layer formed on the bottom surface for randomly reflecting the light beam.

The light conducting body may have a mirror surface reflective layer formed on the bottom surface for subjecting the light beam with mirror surface reflection.

The light conducting body may have a sawtooth-shaped prism formed on the bottom surface.

The induction-heating cooking device may further include a layer formed on a surface other than the top surface for guiding the light beam, the light having a smaller refractive index than that of the light conductive body.

The bottom surface may be formed so as to partially change the reflectance of the light beam.

The light conducting body may be donut-shaped.

Still another induction-heating cooking device according to the present invention includes a light-transmissive cooking board provided on a top surface of a main body case; a heating section provided on the cooking board for heating a cooking container placed thereon by induction heating; a heating coil provided oppositely to the cooking container with respect to the cooking board, the heating coil being provided in correspondence with the heating section; a plurality of first light sources and a plurality of second light sources for emitting light beams; and a light conducting body for guiding the light beams emitted by the plurality of first light sources and the plurality of second light sources and outputting the light beam at a position corresponding to an outer peripheral portion of the heating coil. The plurality of first light sources and the plurality of second light sources are connected parallel to each other. Thus, the above-described objectives are achieved.

The plurality of first light sources and the plurality of second light sources maybe connected in the form of blocks.

The plurality of first light sources and the plurality of second light sources may be connected alternately.

The light conducting body may be annular. The plurality of first light sources and the plurality of second light sources may be arranged in an annular form at a center of the light conducting body.

The light conducting body includes a plurality of light conductive body pieces. A plurality of blocks, each including the light conducting body piece and at least two light sources, may be combined.

The light conducting body may include a wall extending vertically toward the cooking board from an outer peripheral end thereof. The light beams may be directed from the top surface of the wall toward the cooking board.

The plurality of first light sources and the plurality of second light sources may alternately blink.

The induction-heating cooking device may further include a plurality of third light sources for emitting light beams. The plurality of first light sources, the plurality of second light sources, and the plurality of third light sources may sequentially blink.

The induction-heating cooking device may further include lead sections for connecting the plurality of first light sources. The lead sections may be provided radially around a center of the light conducting body.

Each of the lead sections may be twisted.

According to one aspect of the invention, an outer peripheral portion of the light conducting means is lit up. Then, the light beam is transmitted through the light-transmissive cooking board, and the heating state can be displayed on the top surface of the cooking board. Accordingly, the display which is visually separated from the cooking section in a conventional apparatus can be provided in the vicinity of the cooking section. Thus, the induction-heating cooking device can be used in a similar manner to that of a gas cooking device.

The light conducting means and the light emitting means are provided below the heating coil. Owing to such a structure, the light beam is prevented from leaking to an area immediately above the light emitting means. In the case where the light conducting means is formed of a resin or the like, discoloring, deformation or the like of the light conducting means caused by the thermal influences of radiation, conductance or transmission from the cooking container or the like can be prevented. Reduction in the reliability or the like due to malfunction caused by the thermal influences of the strong magnetic field or self-heat generation can be prevented. Reduction in the luminous intensity or the like caused by a temperature rise of the light emitting means can be prevented.

The light conducting means is disc-shaped and has an opening at the center thereof. The light emitting means is provided in the opening of the light conducting means. Owing to such a structure, a display which is uniform in luminous intensity can be provided.

The thickness of the light conducting means is greatest in an inner portion and decreases toward an outer portion. Reflection means is provided on a top surface or a bottom surface of the light conducting means. Owing to such a structure, the loss of the light beam at the time of incidence is reduced. The reflective means reduces the loss of the light beam during propagation. Therefore, a display having a higher luminous intensity with less loss can be provided.

The light conducting means has an illumination surface (a surface having an angle of, for example, 45 degrees with respect to the light propagation direction) at an outer peripheral end of the light conducting means. Owing to such a structure, the propagated light is subjected to total reflection so as to guide the light beam toward the cooking board, i.e., a cooking surface.

Reflection means is provided parallel to the illumination surface provided at the outer peripheral end of the light conducting means. Thus, the loss of the light beam caused at the time of total reflection due to dispersion during production can be reduced.

A wall is provided on a top surface of the illumination surface which is provided at an outer peripheral end of the light conducting means. Display means for randomly reflecting or diffusing a light beam which has been propagated to the top surface of the wall is provided. Owing to such a structure, the display can be provided at a position closer to the cooking board.

A concave surface facing the light emitting means is provided at a border section of the light conducting means. (The border portion has a property of collecting light beams when having a convex surface facing the light emitting means, and dispersing the light beams when having a concave surface facing the light emitting means). Owing to such a structure, the refraction angle can be increased. Thus, even when light emitting means having a small directivity angle is used, a highly luminous, wide range display can be provided.

The light conducting means is fixed to a coil base. Owing to such a structure, the position of the display provided by the light conducting means with respect to the position of the heating area can be restricted.

The light emitting means is fixed to the light conducting means. Owing to such a structure, the position of the display provided by the light conducting means with respect to the position of the light emitting means can be restricted.

The structure in which the output control means is cooled and then the light emitting means and the light conducting means are cooled is provided. Owing to such a structure, reduction in the luminous intensity due to a temperature rise of the light emitting means is prevented, and discoloring, deformation or the like of the resin used for the light conducting means can be prevented.

The light conducting means is provided in blocks. Owing to such a structure, repairing can be easily and rapidly performed by replacing only the block which malfunctions.

According to another aspect of the invention, the on/off state of the power can be easily recognized in the vicinity of the heating-cooking container, and whether heating is being performed or not can be easily recognized. Thus, the induction-heating cooking device can be easily used. When the power is turned on, it is informed by the display provided in the vicinity of the heating section. Therefore, it is easily visually recognized that the power is on.

When the power is turned on, the control means displays that state in the vicinity of the heating section by the display means. When the cooking container is placed and heated, the control means changes the form of the display. Since the form of the display is visually changed in the vicinity of the cooking container, the on/off state of the power and the heating state can be easily confirmed.

When the output is not set for a prescribed time period after the power is turned on, the control means turns the power off. In the case where the induction-heating cooking device includes a plurality of heating sections using induction heating, and there is a heating section for which the output is not set for a prescribed time period after the power is turned on, the control means deletes the display for the heating section. In an induction-heating-cooking device including a plurality of heating sections using induction heating, when the power is turned on, that state is displayed in the vicinity of at least one of the heating sections. Since the number of heating sections for which display is provided is minimized in this manner, the power can be saved. The display can be changed from blinking to lighting-up. The display can be changed by changing the color. Since the display can be changed by a combination of blinking/lighting-up and the change of color, visual recognition can be easily provided.

According to still another aspect of the invention, different outputs are represented by different graphic patterns. Therefore, an appropriate heating section can be easily selected. Specifically, the difference in the rated output is represented by the difference in size of the graphic patterns, the difference in width of the graphic patterns, the difference in number of the graphic patterns, or whether a single graphic pattern or at least two similar graphic patterns are provided. Alternatively, the difference in the rated output is represented by at least one of the difference in color of the graphic patterns or the difference in color darkness of the graphic patterns.

Using such differences, the rated outputs of the heating sections can be visually distinguished easily. The graphic pattern is at least one of a dot, a straight line or a polygon. Since the graphic patterns are simple, the structure of the light emitting means required for the display can be simple. In the case where there are two heating coils, the graphic pattern is provided for one of the two heating coils. Thus, the rated outputs of the heating sections can be distinguished easily. The light emitting means lights up during cooking, and blinks after the cooking is finished until the temperature is decreased to a safe level. Due to such a structure, the proceeding state of the cooking can be easily recognized.

According to still another aspect of the invention, the display is provided around the entirety of the outer periphery of the heating section. Therefore, the heating section can be clearly represented on the cooking board. Since a clear continuous graphic pattern is displayed on the cooking board, the heating state can be easily recognized. Since a straight light beam from the light source can reach a position far from the light source, the entirety of the light conducting means lights up uniformly. Since the reflected light from an area below the light conducting means uniformly reaches an area above the light conducting means, the display is uniform. Since there is little loss by light leakage, a clear graphic pattern can be provided on the cooking board. Graphic patterns having different levels of darkness can be provided on the cooking board. Where the heating coil is circular, the heating section can be clearly represented.

According to still another aspect of the invention, even when one system of light sources malfunctions, the other system of light sources keep on lighting up. Since there are a plurality of systems, various display patterns can be combined. Even when one system of light sources malfunctions, the other system of light sources keep on lighting up. Therefore, the heating section can be visually recognized. Thus, the safety level is improved. Since there are a plurality of systems, the number of combinations of the systems is increased, which also increases the number of display patterns.

For example, the type, color, size or brightness of the light sources can be changed system by system, or the light sources can be lit up, blinked or extinguished system by system. Such changes can be set arbitrarily by the designer in accordance with the function of the device, the state of the device, the use state of the device, or time.

At least two systems of light sources can be connected as a block. In this case, even if one system malfunctions, the other system keeps on lighting up. Therefore, the heating section can be visually recognized, and the malfunction is easily recognized. At least two systems of light sources can be alternately connected. In this case, even if one system malfunctions, the other system keeps on lighting up. Therefore, the heating section can be visually recognized, and a malfunction is easily recognized due to the reduction in the light amount.

The light conducting means can be circularly annular, and a plurality of light sources can be provided in a circularly annular form at the center of the light conducting means. In this case, displays are provided continuously on the cooking board. When there is a place where no display is provided or where the brightness of the display is lower, a malfunction can be easily recognized.

Two systems of light sources can be alternately lit up. Since one of the systems is always lit up, this structure provides the sense of safety. When different colors are used for different systems, visual recognition can be improved. When the systems are not alternately lit up, a malfunction can be easily recognized. At least three systems of light sources can be provided such that each system is lit up. This structure further avoids a situation where visual recognition cannot be provided due to a malfunction. In the case where the systems are lit up sequentially, a malfunction can be easily recognized.

The leads of the light sources can be twisted. This further prevents malfunction or heat generation due to the magnetic field caused by induction heating.

BRIEF DESCRIPTION OF THE DRAWINGS

FIG. 2(*a*) shows one state of a cooking board of the induction-heating cooking device according to the first example of the present invention.

FIG. 2(*b*) shows another state of the cooking board of the induction-heating cooking device according to the first example of the present invention.

FIG. 2(*c*) shows still another state of the cooking board of the induction-heating cooking device according to the first example of the present invention.

FIG. 8(*b*) is a partial expanded view of light conducting means of the induction-heating cooking device according to the second example of the present invention.

FIG. 9(*a*) is a partial expanded view of light conducting means of an induction-heating cooking device according to the second example of the present invention.

FIG. 9(*b*) is a partial expanded view of light conducting means in another form of an induction-heating cooking device according to the second example of the present invention.

FIG. 14(*a*) is a partial expanded view of light conducting means and the vicinity thereof of the induction-heating cooking device according to the fourth example of the present invention.

FIG. 14(*b*) is a partial expanded view of light conducting means and the vicinity thereof in another form of an induction-heating cooking device according to the fourth example of the present invention.

FIG. 29(a) is a wiring diagram of a light source of an induction-heating cooking device according to a twelfth example of the present invention.

FIG. 29(b) shows a graphic pattern provided on a cooking board of the induction-heating cooking device according to the twelfth example of the present invention.

FIG. 35(a) is a wiring diagram of a light source of an induction-heating cooking device according to a thirteenth example of the present invention.

FIG. 35(b) shows a graphic pattern provided on a cooking board of the induction-heating cooking device according to the thirteenth example of the present invention.

BEST MODE FOR CARRYING OUT THE INVENTION

EXAMPLE 1

Figure 1:
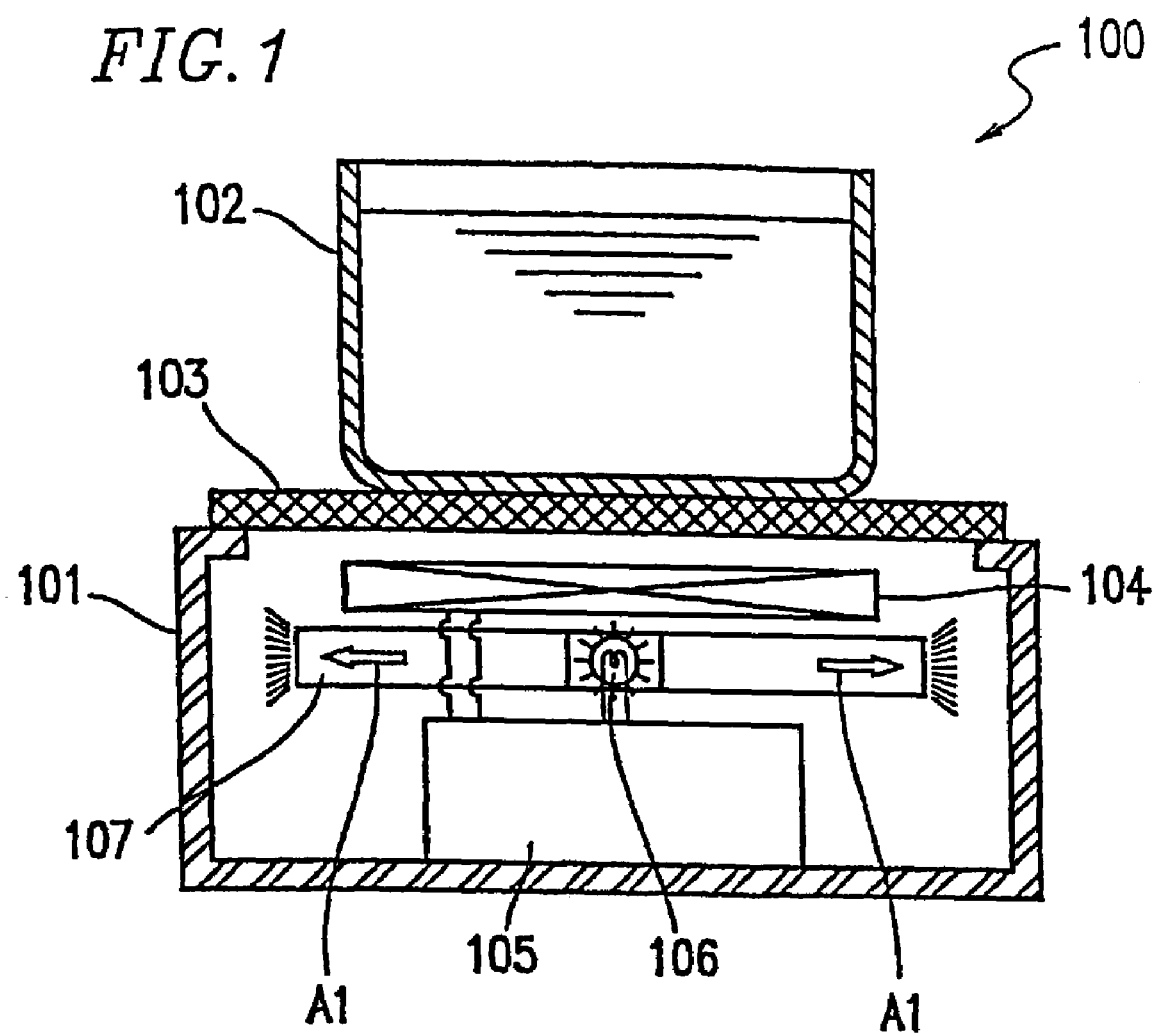
FIG. 1 is a cross-sectional view of an induction-heating cooking device according to a first example of the present invention.

Hereinafter, a first example of the present invention will be described with reference to FIGS. 1 through 7. FIG. 1 is a schematic view of an induction-heating cooking device 100 according to the first example of the present invention. The induction-heating cooking device 100 includes a case 101 forming a main body, a cooking board 103 formed of light-transmissive, heat-resistant glass or the like, on which a cooking container 102 to be heated is to be placed, a heating coil 104 located below the cooking board 103 for heating the cooking container 102, output control means 105 for controlling an output to the heating coil 104, light emitting means 106 located below the heating coil 104 and formed of a light bulb, a semiconductor device or the like for emitting a light beam, and light conducting means 107 located below the heating coil 104 and formed of light-transmissive glass, resin or the like for allowing the light beam from the light emitting means 106 to propagate therethrough. The light emitting means 106 is provided to the inside of an outer peripheral end of the light conducting means 107, so that the light beam passes toward the outer periphery of the light conducting means 107 in a substantially horizontal direction as shown by arrow A1. Thus, an outer peripheral portion of the light conducting means 107 is lit up. The heating coil 104 and the light emitting means 106 are connected to the output control means 105 via a lead or the like. The light conducting means 107 may have an arbitrary shape when seen from the cooking board 103. The light conducting means 107 may have a quadrangular plate-like shape. The light conducting means 107 may have a triangular plate-like shape.

An operation of the induction-heating cooking device 100 having the above-described structure will be described. When the induction-heating cooking device 102 is placed on the cooking board 103 and heating is started, the output control means 105 outputs a signal to the heating coil 104 to instruct heating, and simultaneously outputs a signal to the light emitting means 106 to instruct light emission. The generated light beam is propagated through the light conducting means 107 as shown by arrow A1 so as to light up the outer peripheral portion. As shown in, for example, FIGS. 2(a) through 2(c), the generated light beam is transmitted through the cooking board 103 formed of light-transmissive glass or the like, and displays a heating state on a top surface of the cooking board 103.

As described above, the first example of the present invention lights up the outer peripheral portion of the light conducting means 107 so as to display a heating state on the top surface of the cooking board 103. Accordingly, the heating state, which is conventionally visually separated, is displayed in the vicinity of the cooking section. Thus, the induction-heating cooking device 100 can be used in a manner closer to using a gas cooking device.

By providing the light conducting means 107 and the light emitting means 106 below the heating coil 104, the light beam can be prevented from leaking to immediately above the light emitting means 106. When the light conducting means 107 is formed of a resin or the like, inconveniences such as discoloring, deformation and the like are prevented from occurring due to thermal influences of heat radiation, conductance and transmission from the induction-heating cooking device 100 or the like. The light emitting means 106 formed of a light bulb, a semiconductor device or the like can prevent, for example, reliability from being lowered due to malfunction or self-heat generation caused by the influence of the strong magnetic field. Reduction in the luminous intensity which is caused by a temperature rise of the semiconductor device or the like used for the light emitting means 106 can also be prevented.

As shown in FIGS. 2(a) through 2(c), the heating state is displayed in a circularly annular form, a semi-circularly annular form or a dot line form in the first example. The form is not specifically limited as long as the heating state is displayed on the cooking board 103. It is not necessary that the cooking board 103 is entirely light-transmissive. Even when a part of the cooking board 103 is non-transparent, a similar effect to that described above can be provided.

Figure 3:
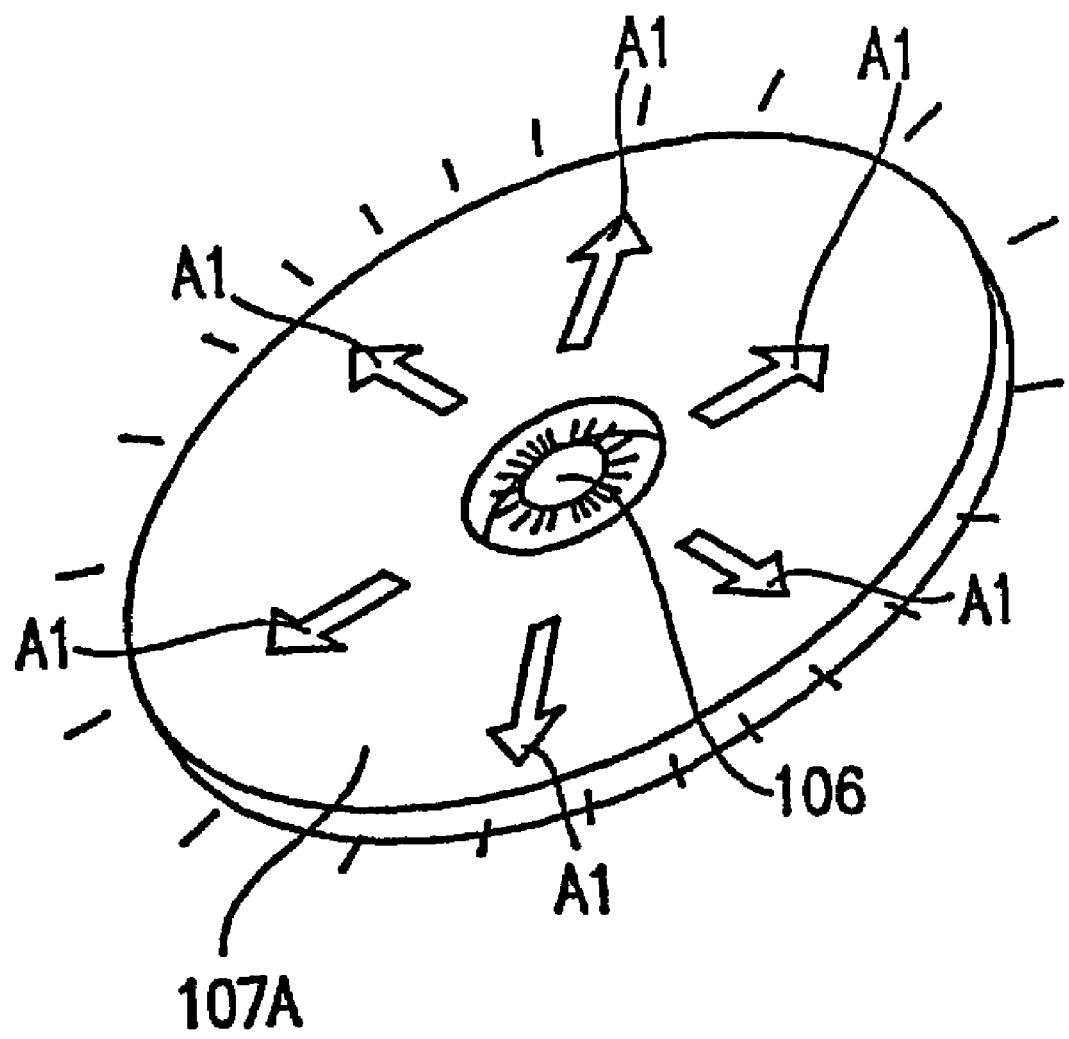
FIG. 3 is an isometric view of light conducting means of the induction-heating cooking device according to the first example of the present invention.

As shown in FIG. 3 as an alternative to the first example, light conductive means 107A formed of light-transmissive glass, resin or the like may be formed to be a disc-shaped. In this case, an opening is formed at the center of the light conductive means 107A, and light emitting means 106 is provided in the opening. A light beam is propagated toward an outer periphery of the light conducting means.

An operation of the induction-heating cooking device having the above-described structure will be described. Most of point light sources such as light bulbs, semiconductor devices or the like used for the light emitting means 106 generally have a certain directivity angle. For example, the luminous intensity of light beam projected in the form of a flat plate parallel to the light emitting means 106 is non-uniform. The reason is because the straight-line distance of each portion of the light beam with respect to the parallel, flat plate is different.

However, according to the first example of the present invention, the straight-line distance from the light emitting means 106 to the outer peripheral end of the light conducting means 107A is constant at the same radius. Thus, display having a uniform luminous intensity can be provided.

A diffusive material may be applied to the outer peripheral end of the light conducting means 107A. The surface of the outer peripheral end of the light conducting means 107A may be processed to randomly reflect light. A separate light receiving member may be integrally formed with or fixed on the outer peripheral end of the light conducting means 107A. In either case, a similar effect to that described above can be provided. The number of the light emitting means 106 can be arbitrarily set by the designer.

Figure 4:
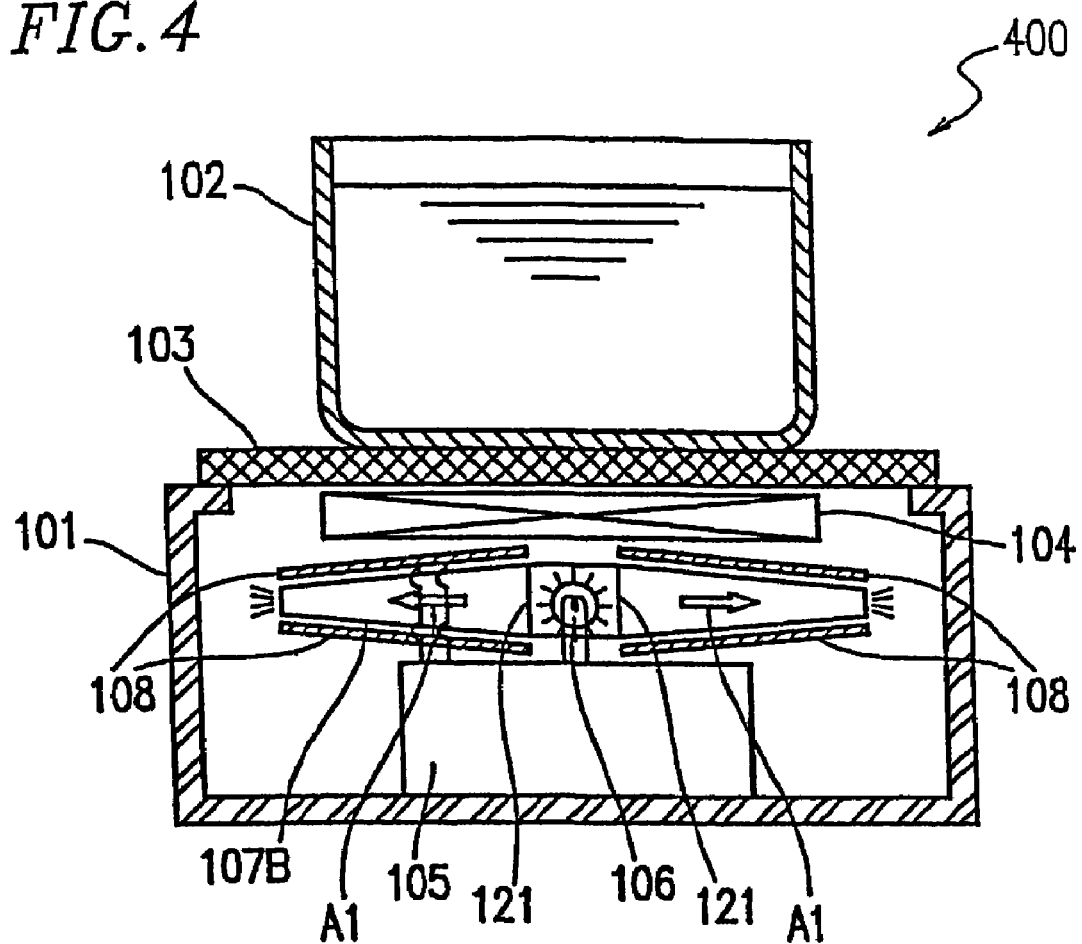
FIG. 4 is a cross-sectional view of an induction-heating cooking device according to the first example of the present invention.

With reference to FIG. 4, another induction-heating cooking device 400 according to the first example of the present invention will be described. Identical elements previously discussed with respect to the induction-heating cooking device 100 in FIG. 1 bear identical reference numerals, and detailed descriptions thereof will be omitted. As shown in FIG. 4, light conductive means 107B formed of light-transmissive resin or the like is formed such that the thickness thereof is greatest at an inner portion and reduces toward the outer periphery. Reflection means 108 formed of a non-transparent resin, a metal plate, a mirror or the like is provided on a top surface, a bottom surface or both surfaces.

An operation of the induction-heating cooking device 400 having the above-described structure will be described. As described above, most of point light sources such as light bulbs, semiconductor devices or the like used for the light emitting means 106 have a certain directivity angle. Therefore, a light incident surface 121 of the light conducting means 107B needs to have a thickness in accordance with the directivity angle of the light emitting means 106. When the thickness of the light incident surface of the light conducting means 107B is thin with respect to the directivity angle of the light emitting means 106, the light beam passing outside the light conducting means 107B is lost. However, it is not reasonable to make the entirety of the light conducting means 107B uniformly thick when the directivity angle of the light emitting means 106 is wide. It is conceivable to form the light conducting means 107B such that the thickness thereof reduces toward the outer periphery, i.e., in the light propagation direction. Since the light beam tends to advance straight, the light beam passes through an inclining surface provided to reduce the thickness, which results in loss of the light beam.

However, when the light conducting means 107B formed of light-transmissive glass, resin or the like is formed such that the thickness thereof is greatest at an inner portion and reduces toward the outer periphery, a reasonable structure is provided while reducing the loss of the light beam at the time of incidence. By providing the reflection means 108 formed of a non-transparent resin, a metal plate, a mirror or the like on the top surface, the bottom surface of both surfaces, a highly luminous display with a smaller loss can be provided.

Figure 5:
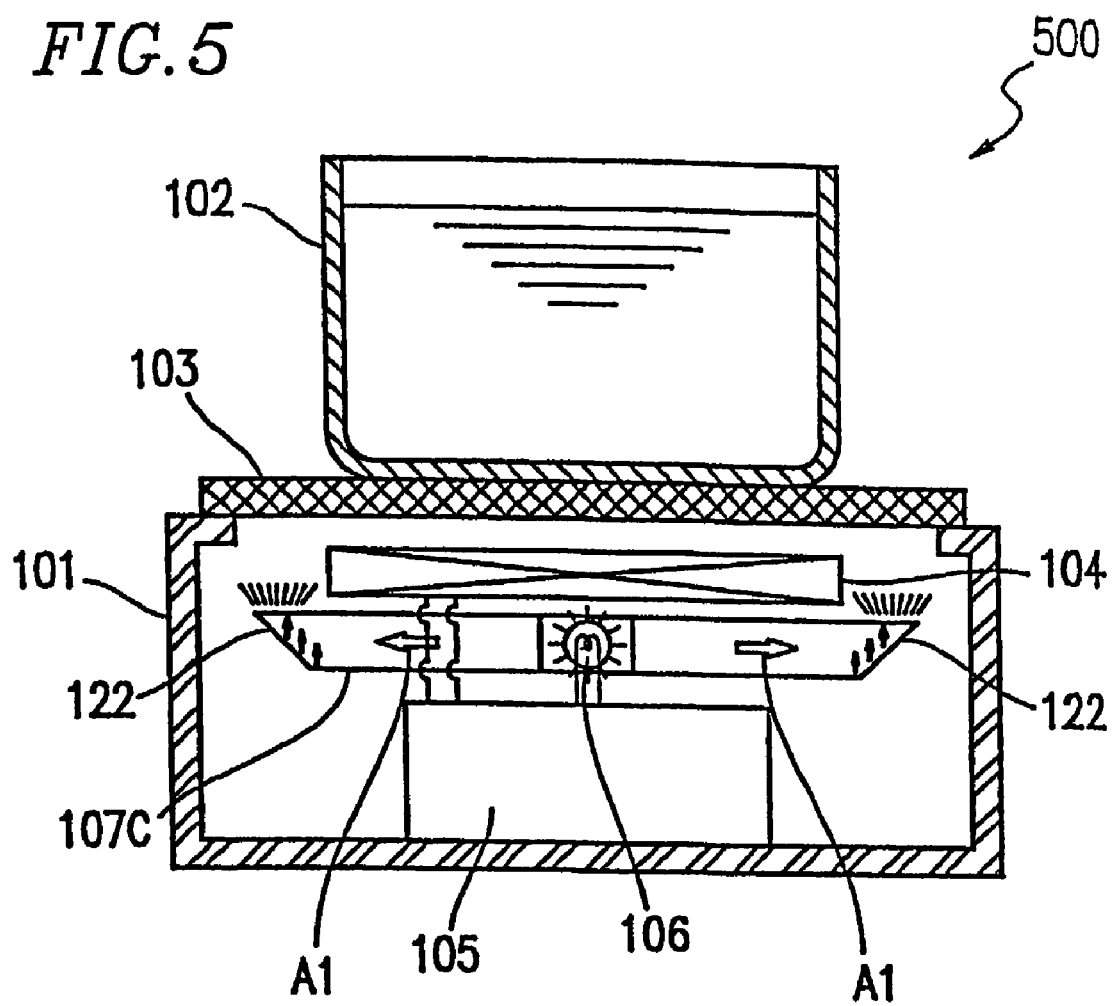
FIG. 5 is a cross-sectional view of another induction-heating cooking device according to the first example of the present invention.

With reference to FIG. 5, another induction-heating cooking device 500 according to the first example of the present invention will be described. Identical elements previously discussed with respect to the induction-heating cooking device 100 in FIG. 1 bear identical reference numerals, and detailed descriptions thereof will be omitted. As shown in FIG. 5, an outer peripheral end of light conductive means 107C formed of light-transmissive glass, resin or the like is provided with a C cut (45 degrees with respect to the light propagation direction (arrow A1)) as an illumination surface 122, such that the light beam propagated is subjected to total reflection.

An operation of the induction-heating cooking device 500 having the above-described structure will be described. When a light beam from the light emitting means 106 formed of a light bulb, a semiconductor device or the like is incident on an end of the light conducting means 107C formed of light-transmissive glass, resin or the like, the light beam propagated through the light conducting means 107C lights up the opposite end of the light emitting means 106. The end is provided with a C cut (45 degrees with respect to the light propagation direction (arrow A1)) as the illuminating surface 122, such that the light beam propagated is subjected to total reflection. Thus, the light beam can be guided toward the cooking board 103, which is a cooking surface.

As described above, the first example of the present invention can provide a clearer display on the top surface of the cooking board 103.

Figure 6:
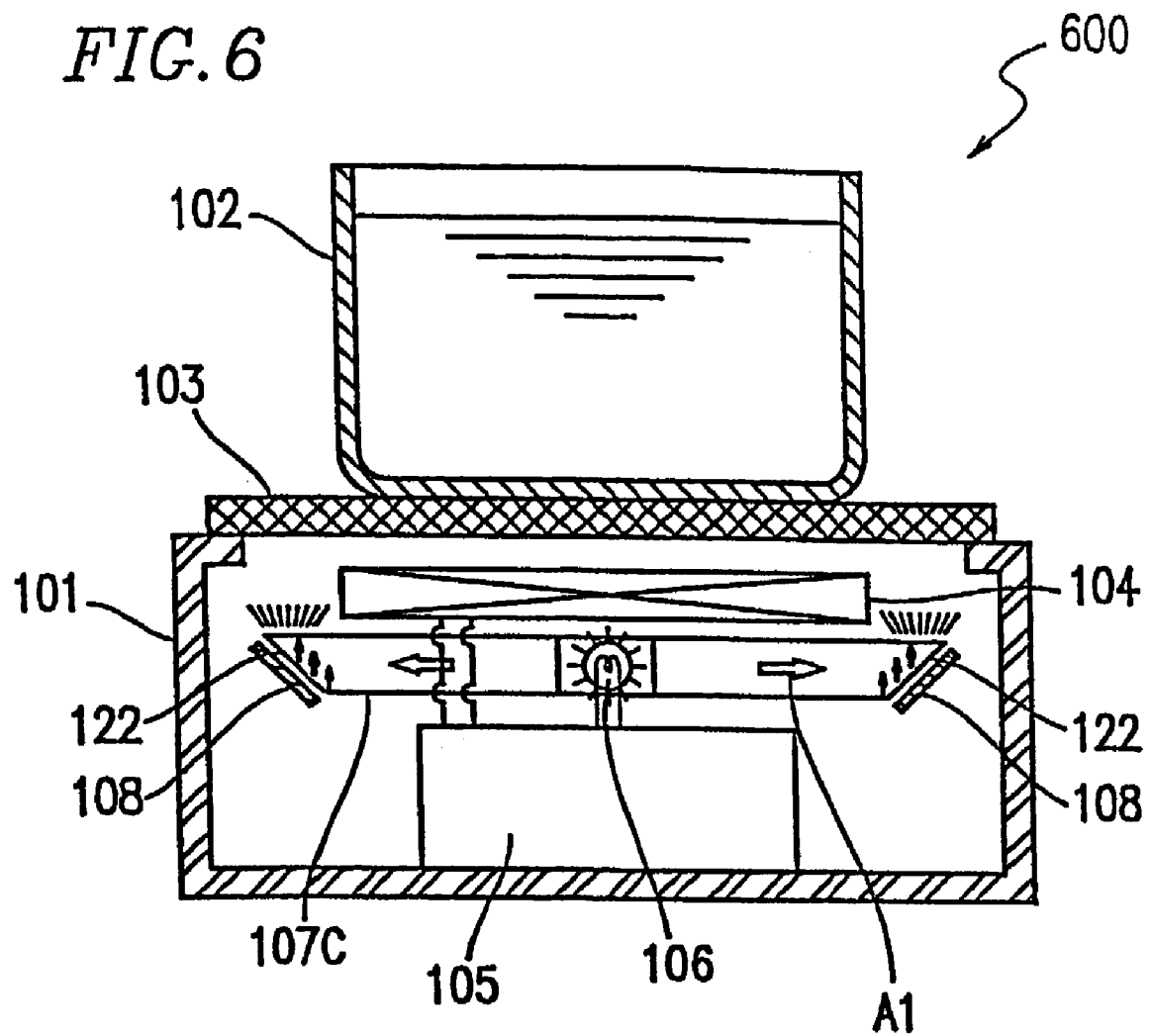
FIG. 6 is a cross-sectional view of still another induction-heating cooking device according to the first example of the present invention.

With reference to FIG. 6, another induction-heating cooking device 600 according to the first example of the present invention will be described. Identical elements previously discussed with respect to the induction-heating cooking device 100 in FIG. 1 bear identical reference numerals, and detailed descriptions thereof will be omitted. As shown in FIG. 6, an outer peripheral end of light conductive means 107C formed of light-transmissive glass, resin or the like is provided with an illumination surface 122 (C cut). Reflection means 108 formed of a non-transparent resin, a metal plate, a mirror or the like is provided parallel to the illumination surface 122.

An operation of the induction-heating cooking device 600 having the above-described structure will be described. When light beam propagated through the light conducting means 107 is subjected to total reflection by the illumination surface 122 (C cut (45 degrees with respect to the light propagation direction)) provided at the outer peripheral end of the light conducting means 107C. However, considering the dispersion during production or the like, it is possible that the light beam is lost by the illumination surface 122 (C cut). In order to avoid this, the reflection means 108 formed of a non-transparent resin, a metal plate, a mirror or the like is provided parallel to the illumination surface 122 (C cut). Thus, the lost light beam is guided toward the cooking board 103, which is a cooking surface.

As described above, the first example of the present invention can guide even the light beam, which is lost due to dispersion during production or the like, toward the cooking board 103, which is a cooking surface, owing to the reflection means 108. Thus, a clearer display can be provided.

In the first example, the reflection means 108 is provided. Instead, the illumination surface 122 (C cut) may be provided with a convex and concave surface, provided with a diffusive material applied thereto, or provided with a separate light receiving member integrally formed therewith or fixed thereon. A similar effect to that described above can be provided.

Figure 7:
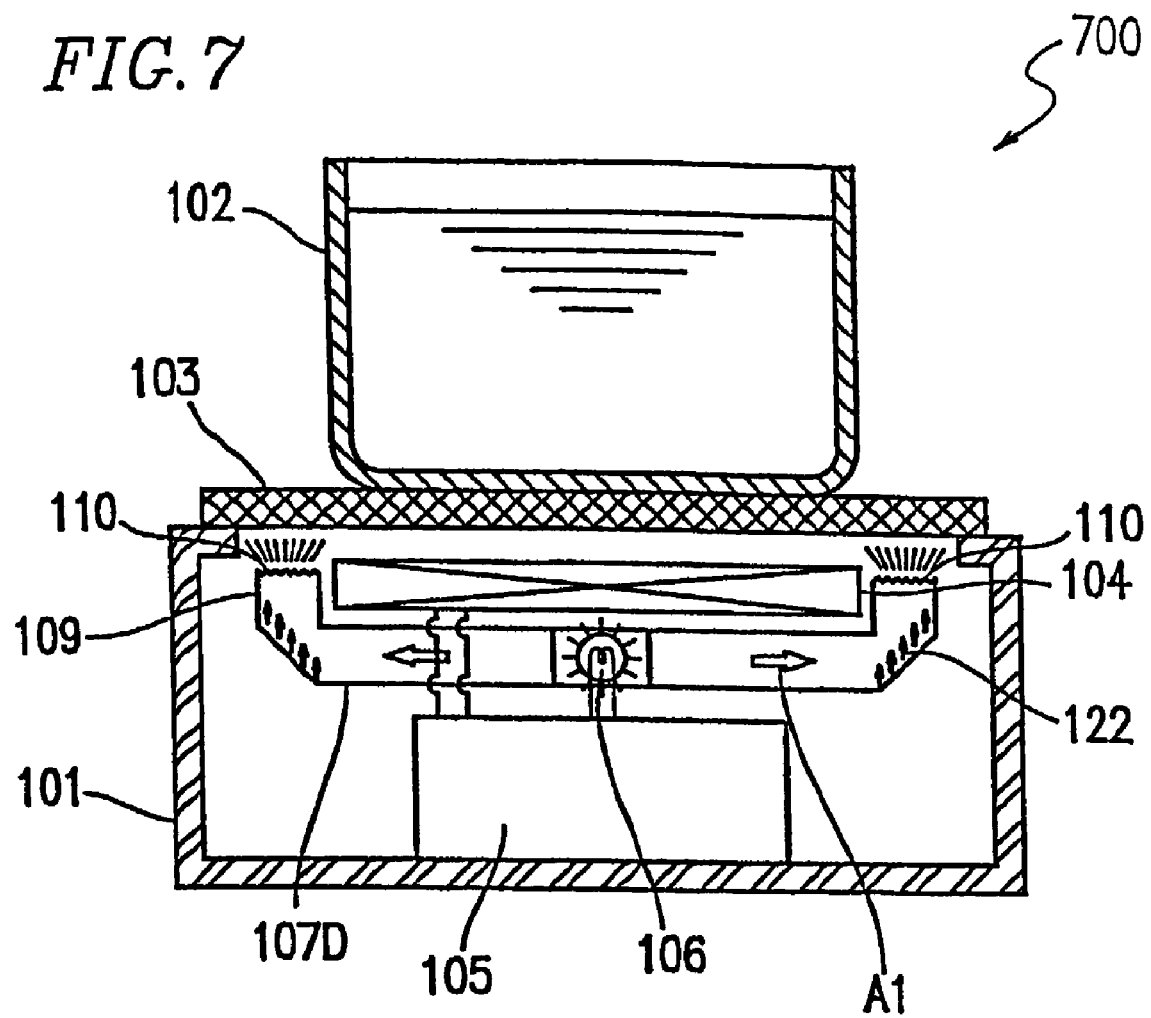
FIG. 7 is a cross-sectional view of still another induction-heating cooking device according to the first example of the present invention.

With reference to FIG. 7, another induction-heating cooking device 700 according to the first example of the present invention will be described. Identical elements previously discussed with respect to the induction-heating cooking device 100 in FIG. 1 bear identical reference numerals, and detailed descriptions thereof will be omitted. As shown in FIG. 7, the induction-heating cooking device 700 includes a wall section 109 provided on a top surface of the illumination surface 122 (C cut), which is provided at the outer peripheral end of the light conducting means 107D formed of light-transmissive glass, resin or the like. The wall section 109 extends vertically to the cooking board 103 formed of light-transmissive, light-resistive glass or the like. The induction-heating cooking device 700 also includes display means 110 for randomly reflecting or diffusing the propagated light beam on a top surface of the wall section 109.

An operation of the induction-heating cooking device 700 having the above-described structure will be described. The light beam guided toward the cooking board 103 as a result of the total reflection at the illumination surface 122 (C cut) appears to be quite below the cooking board 103, since the light conducting means 107D is positioned below the heating coil 104. However, in this example, the wall section 109 is provided on the top surface of the light conducting means 107 so as to guide the light beam toward the cooking board 103, and the display means 110 for randomly reflecting or diffusing the light beam is provided on the top surface of the wall section 109. Therefore, the display can be provided at a position closer to the cooking board 103. The display means 110 may have a convex and concave surface thereon so as to randomly reflect or diffuse the light beam. Alternatively, the display means 110 may have a diffusive material applied thereto. Still alternatively, the display means 110 has a separate light receiving member integrally formed therewith or fixed thereto.

As described above, the first example of the present invention can provide the display at a position closer to the cooking board 103, which improves the visual recognizability.

The top surface of the wall section 109 may be in close contact with the cooking board 103. A similar effect to that described above can be provided. The top surface of the wall section 109 may be inclined, curved or altered in shape in an arbitrary manner by the designer. The top surface or a bottom surface of the cooking board 103 may be provided with a similar convex and concave surface or processed so as to diffuse light. A similar effect to that described above can be provided.

EXAMPLE 2

Figure 8:
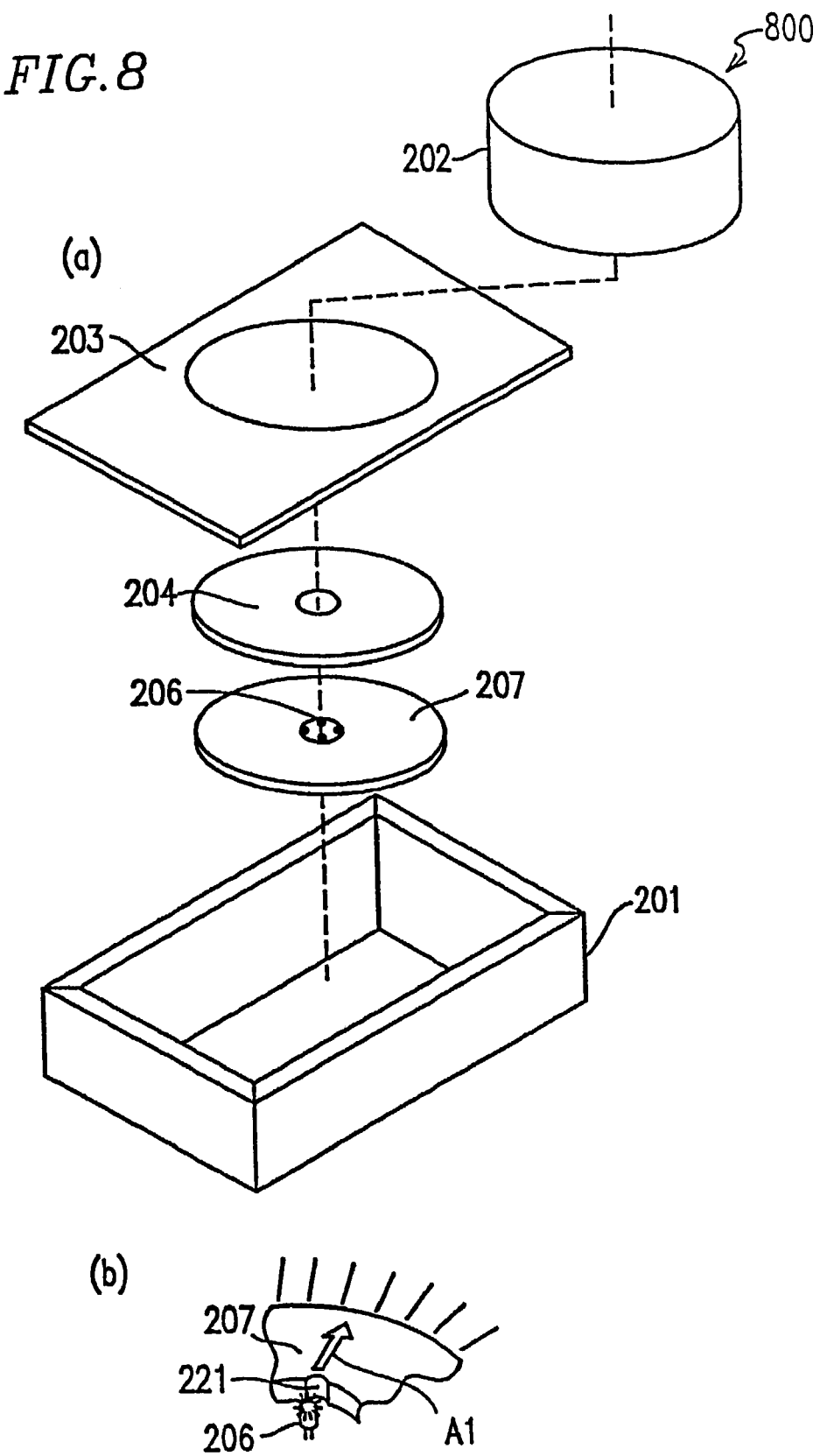
FIG. 8(*a*) is an exploded isometric view of an induction-heating cooking device according to a second example of the present invention.

With reference to FIGS. 8(a), 8(b), 9(a) and 9(b), a second example of the present invention will be described. FIG. 8(a) is a schematic view of an induction-heating cooking device 800 according to the second example of the present invention. The induction-heating cooking device 800 includes a case 201 forming a main body, a cooking board 203 formed of light-transmissive, heat-resistant glass or the like, on which a cooking container 202 to be heated is to be placed, a heating coil 204 located below the cooking board 203 for heating the cooking container 202, light emitting means 206 located below the heating coil 204 and formed of a light bulb, a semiconductor device or the like for emitting a light beam, and light conducting means 207 located below the heating coil 204 and formed of light-transmissive glass, resin or the like for allowing the light beam from the light emitting means 206 to propagate therethrough. FIG. 8(b) is a partially enlarged view of the light conducting means 207 of the induction-heating cooking device 800. As shown in FIG. 8(b), a border section of the light conducting means 207 which receives the light beam from the light emitting means 206 is formed to have a curved portion 221 which has a concave surface facing the light emitting means 206.

An operation of the induction-heating cooking device 800 having the above-described structure will be described. Most of the light beams from the light emitting means 206 formed of a light bulb, a semiconductor device or the like, usually expand over a certain directivity angle, and the range of the light beam used for display is determined by the directivity angle. For example, when the light conducting means is disc-shaped as in the first example, the range for display is determined by total angle (360 degrees)/directivity angle. However, few light beams have a directivity angle exceeding 90 degrees. Thus, a plurality of light emitting means 206 are required. However, when the directivity angle is large, the loss of light at the time of incidence on the light conducting means 207 is also large. When light is not directly used for display but light is propagated using the light conducting means 207, the light beam is lost during propagation. Therefore, the light emitting means 206 needs to have a significant level of luminous intensity. In order to obtain such a high level of luminous intensity, the directivity angle inevitably needs to be small. Usually, when a light beam passes through a border between two substances, the light beam is refracted with respect to the angle of light beam incidence, and shows a negative property (angle of refraction) with respect to the angle at which the light beam is incident (angle of incidence). This further increases the required number of light emitting means 206.

As described above, a significant number of light emitting means 206 are required in consideration of the loss of the light beam at the time of incidence, the loss of the light beam during propagation, reduction in the luminous intensity used for display, the refraction of the light beam, and the like. In this example, the curved surface 221 is provided which has a concave surface facing the light emitting means 206 at the border portion of the light conducting means 207 (the border portion has a property of collecting light beams when having a convex surface facing the light emitting means 206 and dispersing the light beams when having a concave surface facing the light emitting means 206). Owing to the curved surface 221, even when the light emitting means 206 has a small directivity angle, a highly luminous, wide range display can be provided. The radius of the concave curved surface 221 can be arbitrarily set by the designer.

In FIG. 8(b), the light beam is propagated from an inner portion toward an outer portion of the light conducting means. As shown in FIG. 9(a), the light beam may be propagated from an outer portion to an inner portion. As shown in FIG. 9(b), the light emitting means 206 may be provided below the light conducting means 207 such that the light beam is propagated from a lower portion toward an upper portion. In either case, a similar effect to that described above can be provided.

EXAMPLE 3

Figure 10:
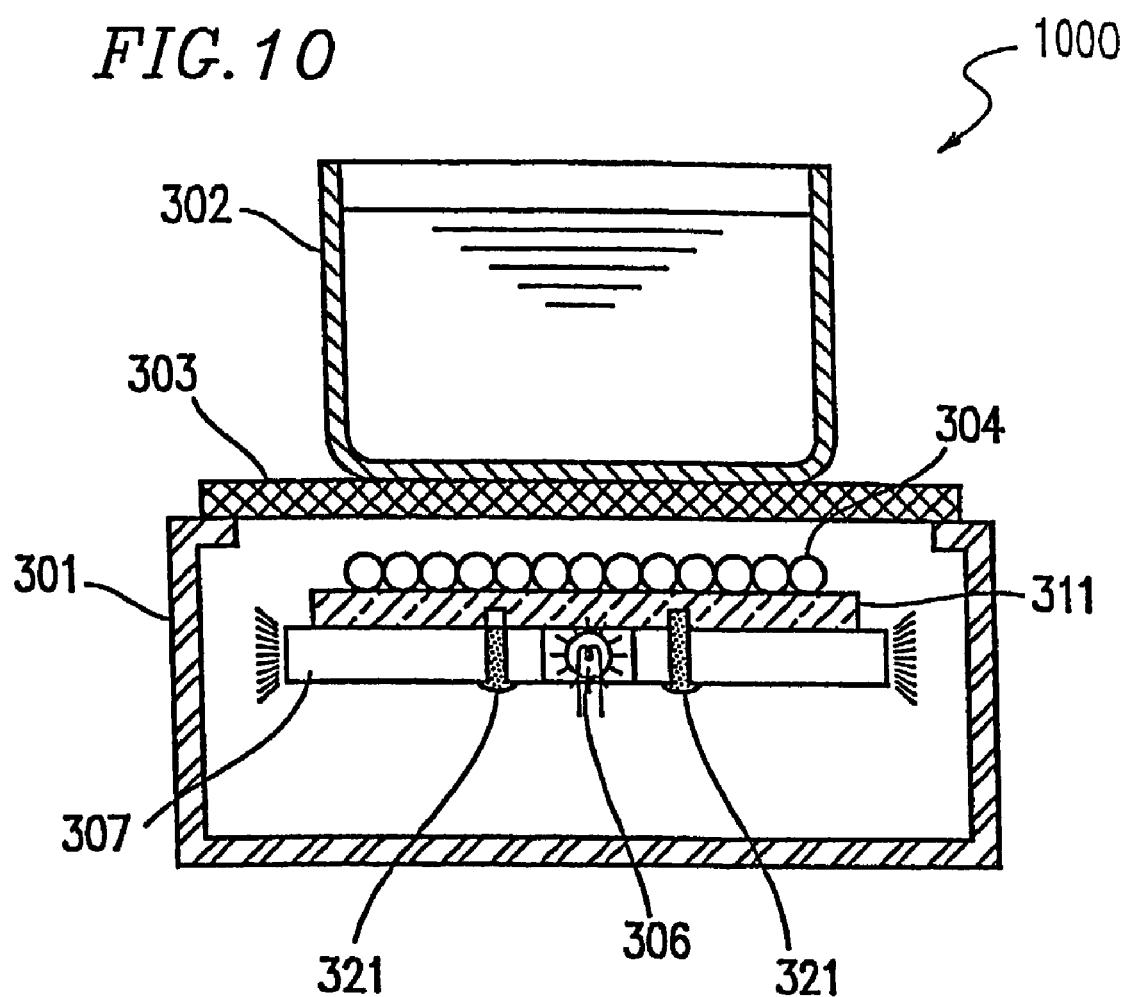
FIG. 10 is a cross-sectional view of an induction-heating cooking device according to a third example of the present invention.
Figure 11:
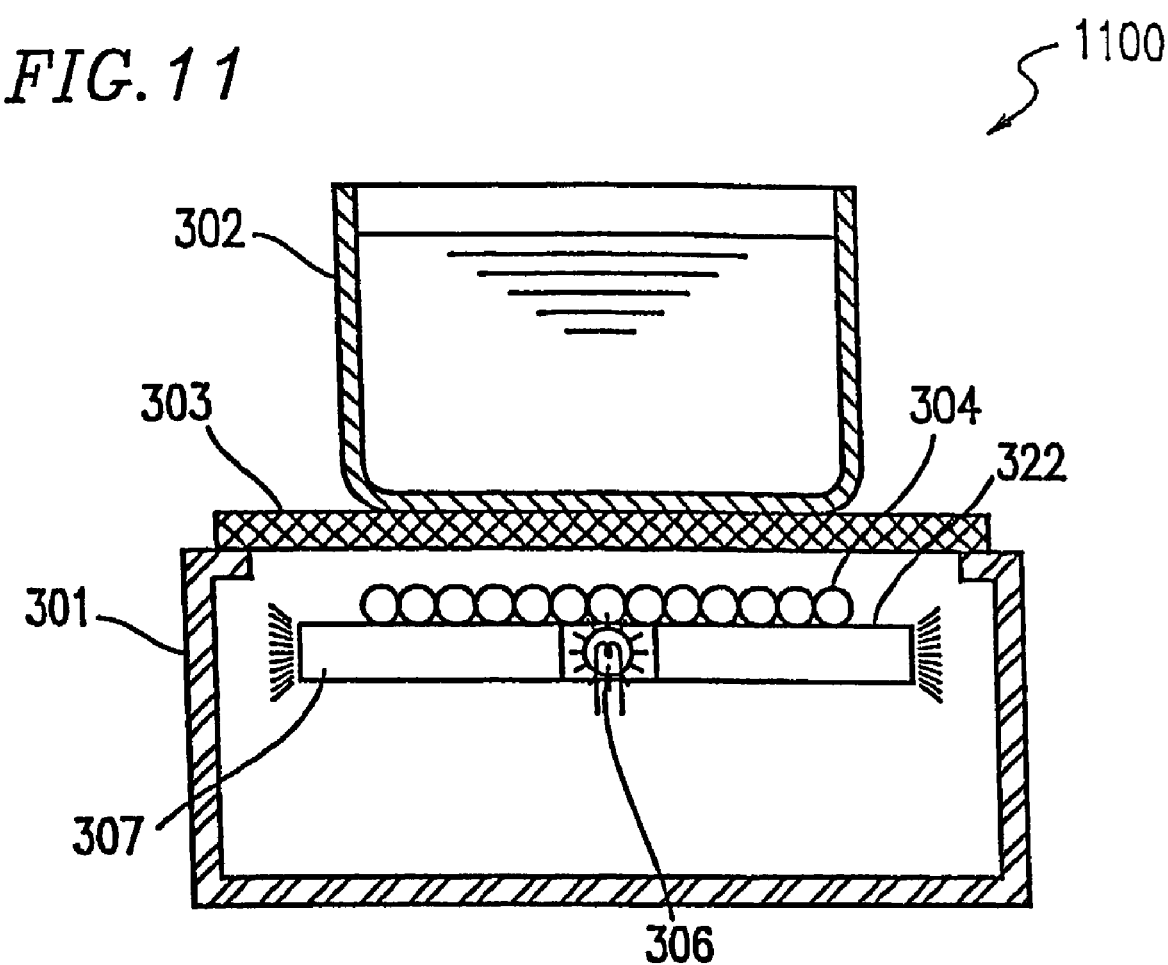
FIG. 11 is a cross-sectional view of the induction-heating cooking device according to the third example of the present invention.
Figure 12:
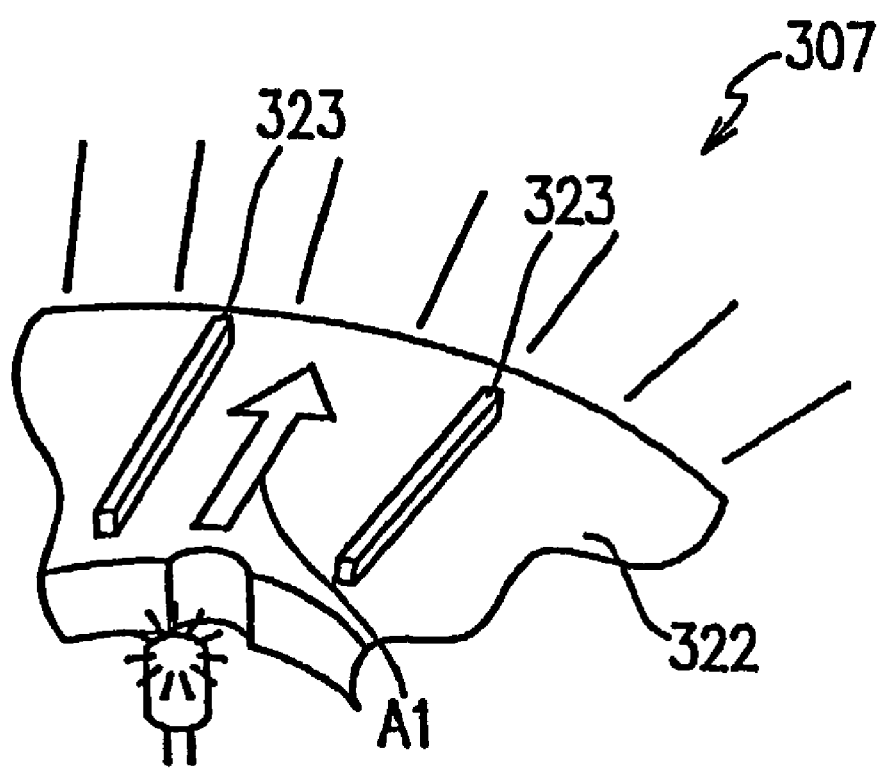
FIG. 12 is a partial expanded view of light conducting means of the induction-heating cooking device according to the third example of the present invention.

With reference to FIGS. 10, 11 and 12, a third example of the present invention will be described.

FIG. 10 is a schematic view of an induction-heating cooking device 1000 according to the third example of the present invention. The induction-heating cooking device 1000 includes a case 301 forming a main body, a cooking board 303 formed of light-transmissive, heat-resistant glass or the like, on which a cooking container 302 to be heated is to be placed, a heating coil 304 located below the cooking board 303 for heating the cooking container 302, a coil base 311 formed of a heat-resistant resin or the like, on which the heating coil 304 is to be placed, light emitting means 306 located below the heating coil 304 and formed of a light bulb, a semiconductor device or the like for emitting a light beam, and light conducting means 307 located below the heating coil 304 and formed of light-transmissive glass, resin or the like for allowing the light beam from the light emitting means 306 to propagate therethrough. The light conducting means 307 is attached by a screw 321 or fixed by an adhesive to the coil base 311.

An operation of the induction-heating cooking device 1000 having the above-described structure will be described. A heating state of the induction-heating cooking device 1000 is displayed on a top surface of the cooking board 303 by the light conducting means 307. The relationship between the heating area and the position at which the heating state is displayed by the light conducting means 307 is important. When the heating area is deviated with respect to the position at which the heating state is displayed by the light conducting means 307, the position at which the cooking container 302 is placed is deviated with respect to the heating area. Then, inconveniences such as reduction in the heating efficiency or non-uniformity in the heating distribution are expected. By attaching or fixing the light conducting means 307 to the coil base 309 by a screw or an adhesive, the heating area and the position at which the heating state is displayed by the light conducting means 307 can be prevented from deviating with respect to each other.

As an alternative example, FIG. 11 shows an induction-heating cooking device 1100, in which the light conducting means 307 also acts as a coil base on which the heating coil 304 is to be placed.

In the induction-heating cooking device 1100 shown in FIG. 11, the heating coil 304 for heating the cooking container 302 is directly placed on the light conducting means 307. This prevents the heating area and the position at which the heating state is displayed by the light conducting means 307 from deviating with respect to each other, and also simplifies the structure. When the light conducting means 307 is formed of a resin or the like, inconveniences such as discoloring, deformation and the like are expected to occur due to the thermal influences such as self-heat generation of the heating coil 304 or heat radiation, conductance or transmission from the cooking container 302. In order to avoid this, it is conceivable to, as shown in FIG. 12, form ribs 323 on a contact surface 322 of the light conducting means 307 which contacts the heating coil 304. This reduces the contact area between the light conducting means 307 and the heating coil 304, thus alleviating the thermal influences. The ribs 323 may be formed of a separate member of a heat-resistant insulating material or the like. A similar effect to that described above can be provided.

EXAMPLE 4

Figure 13:
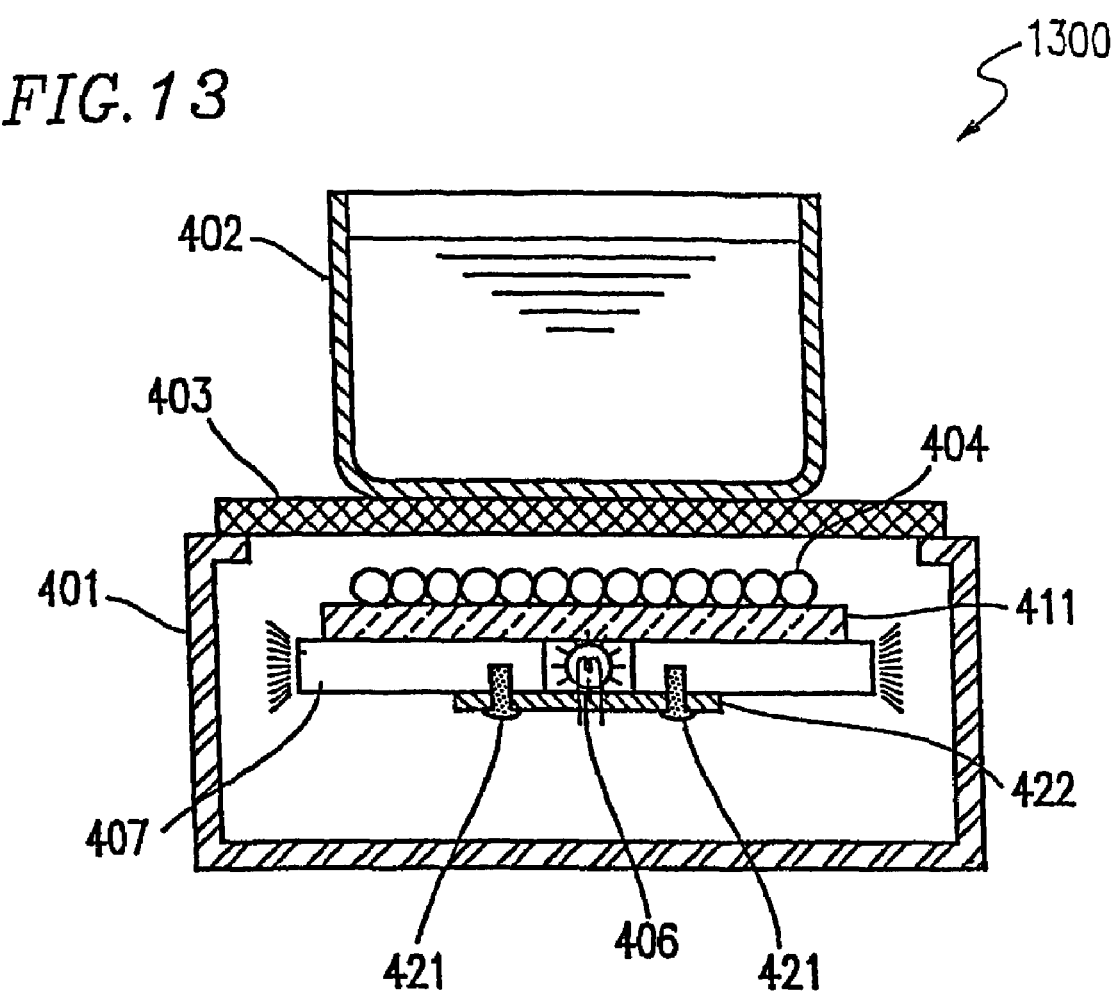
FIG. 13 is a cross-sectional view of an induction-heating cooking device according to a fourth example of the present invention.

With reference to FIGS. 13, 14(a) and 14(b), a fourth example of the present invention will be described. FIG. 13 is a schematic view of an induction-heating cooking device 1300 according to the fourth example of the present invention. The induction-heating cooking device 1300 includes a case 401 forming a main body, a cooking board 403 formed of light-transmissive, heat-resistant glass or the like, on which a cooking container 402 to be heated is to be placed, a heating coil 404 located below the cooking board 403 for heating the cooking container 402, a coil base 411 on which the heating coil 404 is to be placed, light emitting means 406 located below the heating coil 404 and formed of a light bulb, a semiconductor device or the like for emitting a light beam, and light conducting means 407 located below the heating coil 404 and formed of light-transmissive glass, resin or the like for allowing the light beam from the light emitting means 406 to propagate therethrough. The light emitting means 406 is attached by a screw 421 or fixed by an adhesive to the light conducting means 407.

An operation of the induction-heating cooking device 1300 having the above-described structure will be described. As described in the first example, most of the light beams emitted by the light emitting means 406 formed of a light bulb, a semiconductor device or the like, usually expand over a certain directivity angle. The following inconveniences are expected. The light beam is lost at the time of incidence due to the positional deviation between the light emitting means 406 and the light conducting means 407. As a result, the display is difficult to see through the cooking board 403 due to the insufficient amount of light, or the display is non-uniform due to the non-uniform luminous intensity. By screwing or fixing the light emitting means 406 to the light conducting means 407 by a screw or an adhesive, the position of incidence of the light beam emitted by the light emitting means 406 can be restricted. Therefore, the loss of the light beam at the time of incidence can be minimized.

In FIG. 13, the light emitting means 406 is attached to by a screw or fits in the light conducting means 407 parallel to the light conducting means 407. This is easy in terms of production. As shown in FIG. 14(a), a substrate 422 of the light emitting means 406 may be parallel to the light conducting means 407. Only the light bulb, the semiconductor device or the like is provided in the same direction as the light beam propagation direction. As shown in FIG. 14(b), the substrate 422 of the light emitting means 406 may be vertical to the light conducting means 407. The light bulb, the semiconductor device or the like is provided vertical to the light beam propagation direction. These structures can further reduced the loss of the light beam at the time of incidence.

EXAMPLE 5

Figure 15:
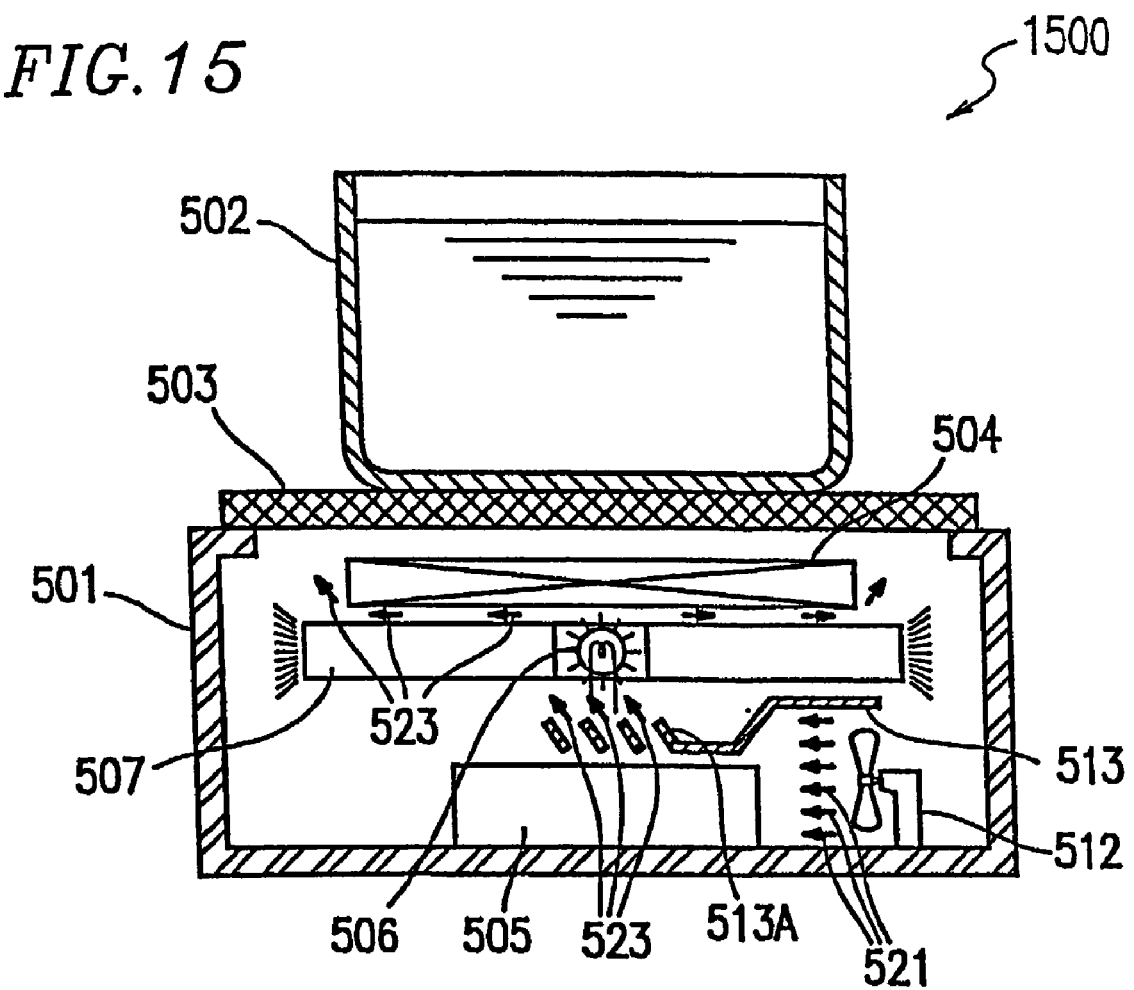
FIG. 15 is a cross-sectional view of an induction-heating cooking device according to a fifth example of the present invention.

With reference to FIG. 15, a fifth example of the present invention will be described. FIG. 15 is a schematic view of an induction-heating cooking device 1500 according to the fifth example of the present invention. The induction-heating cooking device 1500 includes a case 501 forming a main body, a cooking board 503 formed of light-transmissive, heat-resistant glass or the like, on which a cooking container 502 to be heated is to be placed, a heating coil 504 located below the cooking board 503 for heating the cooking container 502, output control means 505 for controlling an output from the heating coil 504, ventilation means 512 formed of a fan or the like for cooling the output control means 505, a duct 513 forming a path for sending air to the output control means 505, light emitting means 506 located below the heating coil 504 and formed of a light bulb, a semiconductor device or the like for emitting a light beam, and light conducting means 507 located below the heating coil 504 and formed of light-transmissive glass, resin or the like for allowing the light beam from the light emitting means 506 to propagate therethrough. The induction-heating cooking device 1500 is structured such that the light emitting means 506 and the light conducting means 507 are cooled after the output control means 505 is cooled.

An operation of the induction-heating cooking device 1500 having the above-described structure will be described. Cooling air generated by the ventilation means 512 cools the output control means 505 via the duct 513. As shown in FIG. 15, an outlet section 513A of the duct 513 is shaped such that the air is directed toward the light emitting means 506 and the light conducting means 507. Thus, the air cools the output control means 505, and after that cools the light emitting means 506 and flows between the light conducting means 507 and the heating coil 504 toward the cooking board 503. Therefore, the luminous intensity of the semiconductor device used for the light emitting means 506 can be prevented from being lowered, and inconveniences such as discoloring, deformation and the like of the resin used for the light conducting means 507 can be prevented from occurring due to the thermal influence of radiation, conductance or transmission from the cooking container 502 or the like, or the thermal influence of self-heat generation of the heating coil 504.

EXAMPLE 6

Figure 16:
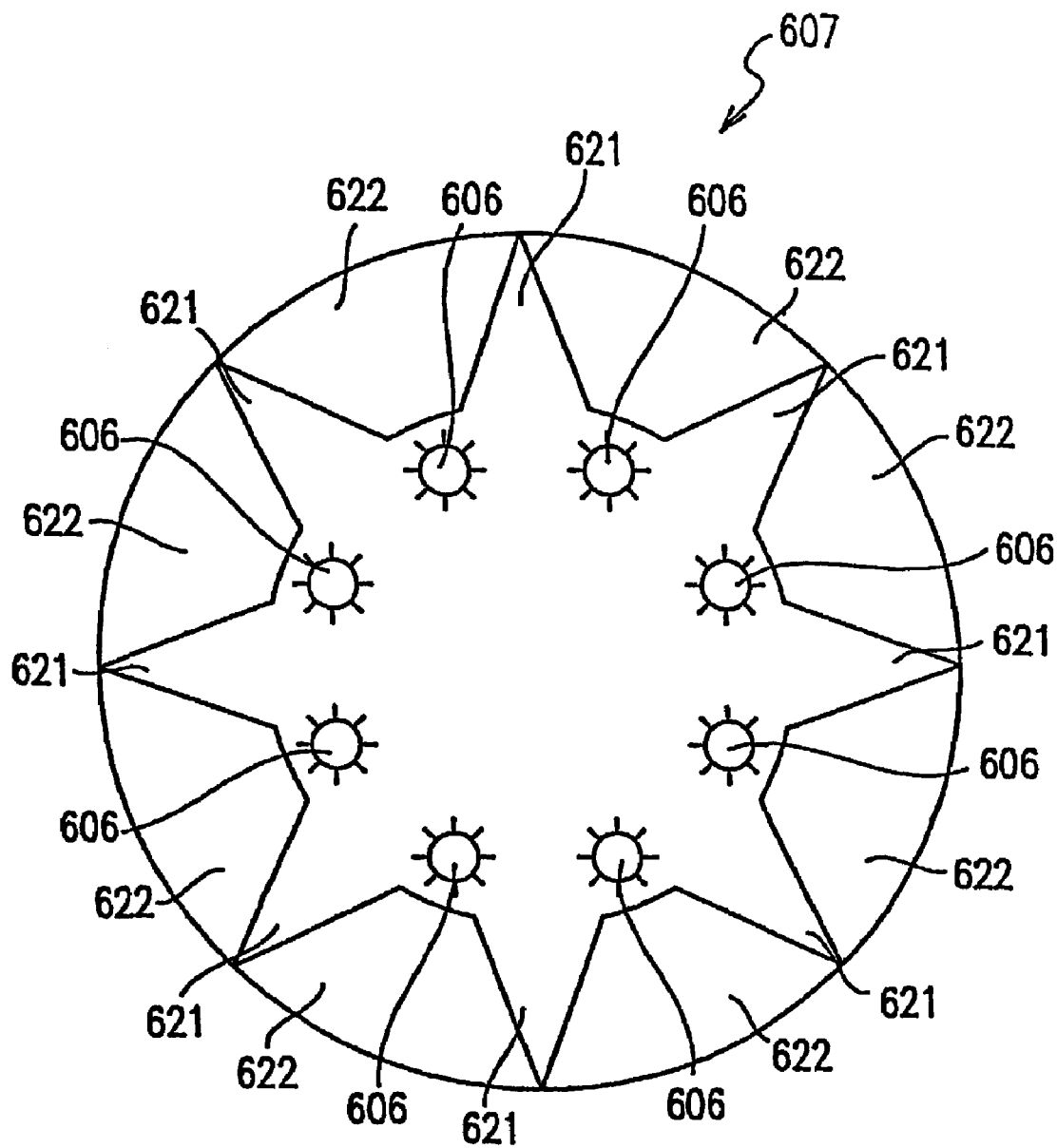
FIG. 16 is a partial expanded view of the induction-heating cooking device according to a fifth example of the present invention.

With reference to FIG. 16, a sixth example of the present invention will be described. FIG. 16 shows light emitting means 606 formed of a light bulb, a semiconductor device or the like for emitting a light beam, and light conducting means 607 formed of light-transmissive glass, resin or the like for allowing the light beam from the light emitting means 606 to propagate therethrough. The light conducting means 607 includes a plurality of light conducting blocks 622 corresponding to a plurality of light emitting means 606. The light conducting blocks 622 are obtained by forming the light conducting means 607 into blocks.

An operation of the induction-heating cooking device including the light emitting means 606 and the light conducting means 607 having the above-described structure will be described. The light conducting means 607 includes light conducting blocks 622 which are formed into blocks in accordance with the directivity angle of the light emitting means 606. When a plurality of light conducting blocks 622 are combined, a space 621 can be formed as shown in FIG. 16. As described in the fifth example, the space 621 is very advantageous for cooling and improves the cooling ability of the induction-heating cooking device.

The light conducting means 607 is provided in the form of blocks. Therefore, even when a part of the light conducting means 607 malfunctions, only the light conducting block which malfunctions needs to be replaced. Thus, the light conducting means 607 can be repaired rapidly and easily.

EXAMPLE 7

Figure 17:
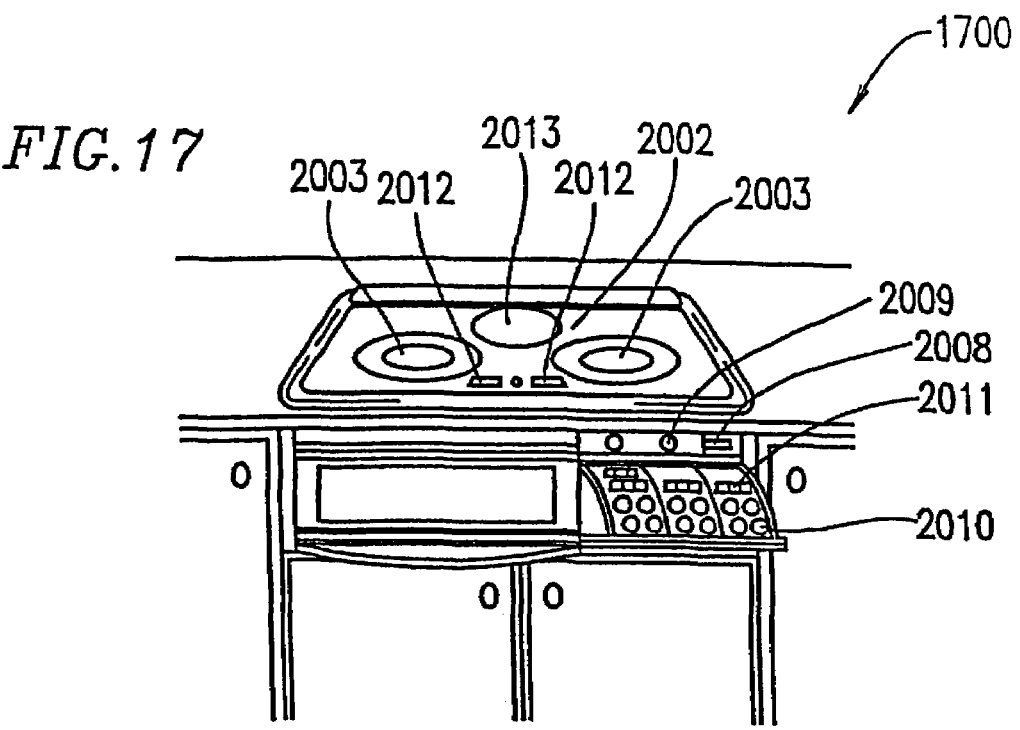
FIG. 17 is an isometric view of an induction-heating cooking device according to fourth through sixth examples of the present invention.

In seventh through ninth examples of the present invention, a so-called dual heating cooking stove including two heating sections which operate by induction heating will be described. FIG. 17 is an isometric view of an induction-heating cooking device 1700 according to the seventh through ninth examples of the present invention, and FIG. 18 is a cross-sectional view of the induction-heating cooking device 1700.

Figure 18:
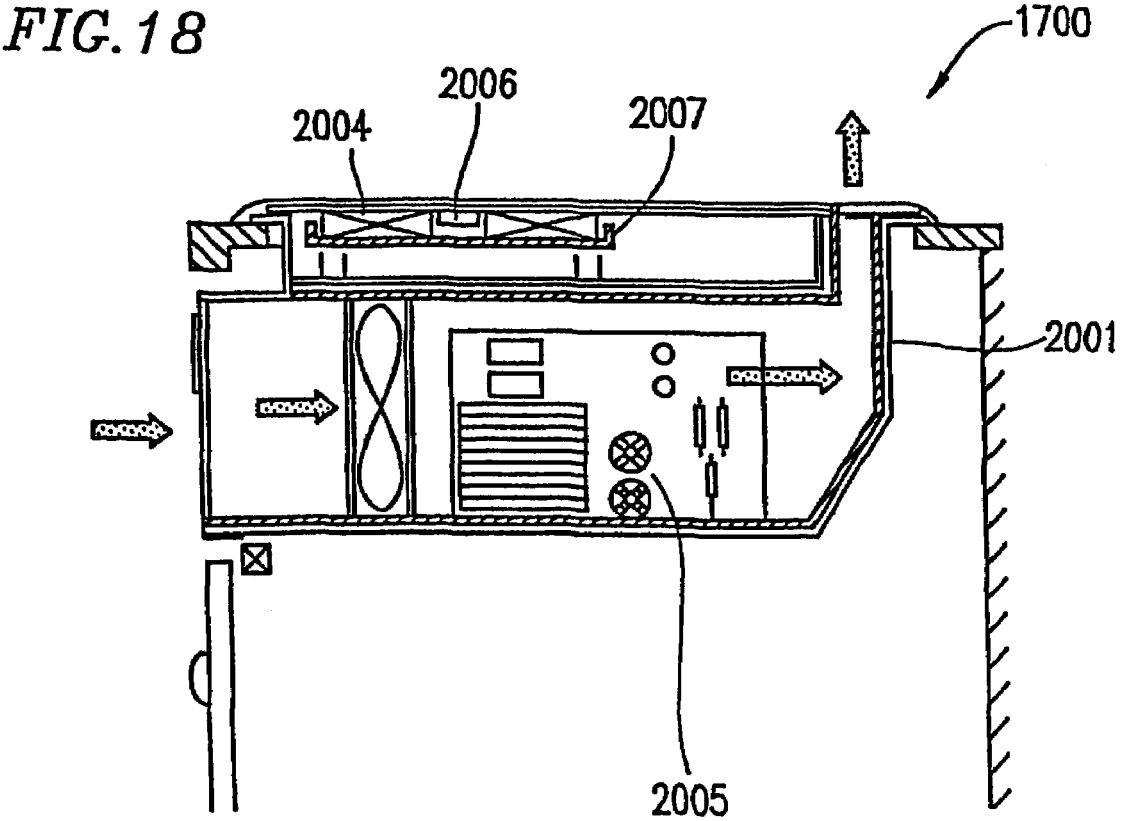
FIG. 18 is a cross-sectional view of the induction-heating cooking device according to the fourth through the sixth examples of the present invention.

As shown in FIGS. 17 and 18, the induction-heating cooking device 1700 includes a case 2001 forming a main body, a light-transmissive cooking board 2002 provided on a top surface of the case 2001, heating sections 2003 for heating a cooking container provided thereon by induction heating, heating coils 2004 provided below the cooking board 2002 in correspondence with the heating sections 2003 for heating the heating sections 2003, a control section 2005 for controlling the contents of the display of the heating coil 2004, a temperature sensor 2006 for sensing the temperature of the heating sections 2003, light emitting means 2007 for displaying a use state on the cooking board 2002, a power switch 2008 for turning on/off the power, a power display section 2009 for displaying the on/off state of the power switch 2008, an output setting section 2010 for setting the output, an output display section 2011 for displaying the setting state of the output, and second output display sections 2012 provided on a front area of the cooking board 2002. Reference numeral 2013 represents a radiation heater used for heating an aluminum pan or a copper pan which cannot be heated by induction heating. Hereinafter, the seventh example will be specifically described.

In the seventh example, the display allows the user to visually recognize that the heating section 2003 is turned on at the same time when the power is turned on. In the seventh example, graphic patterns are used for display. With the above-described structure, when the power switch 2008 is turned on, the power display section 2009 is lit up. At the same time, the light emitting means 2007 emits light. The light is transmitted through the light-transmissive cooking board 2002 and displays a graphic pattern, in the vicinity of the heating sections 2003, which indicates that the power has been turned on. The graphic pattern may be any thing which is easy to be visually recognized, and thus may be a rod-like pattern having a size of about the radius of the heating coil 2004. A graphic pattern which partially or entirely covers a periphery of the heating coil 2004, for example, a part or an entirety of a circle, a quadrangle or other polygons are sufficiently large to be easily recognized visually. Such a graphic pattern also clearly shows the position at which the cooking container is to be placed, and thus improves the ease of use.

The graphic patterns may be displayed by lighting up or by blinking. Various colors including red, blue and the like may be used. When there are two heating sections 2003 using induction heating as in the seventh example, the states of the heating sections 2003 may be displayed in different forms. For example, the state of the heating section for frying may be displayed by blinking, and the state of the heating section for pans may be displayed by lighting-up. The color may be changed in accordance with the output of the heating section.

In the seventh example, the light-transmissive cooking board 2002 is used. It is not necessary that the cooking board 2002 is entirely light-transmissive. A portion required for displaying a graphic pattern may be light-transmissive, and the rest may be non-light transmissive.

Next, the light emitting means 2007 will be described. For displaying a rod-shaped graphic pattern, rod-shaped light emitting bodies, light bulbs, or semiconductor devices such as LEDs may be arranged linearly. For displaying a graphic pattern partially or entirely covering the heating section 2003, annular light emitting bodies, light bulbs or semiconductor devices may be arranged, but this may undesirably raise the cost. It is practical to use a light conducting plate as the light emitting means 2007.

Figure 19:
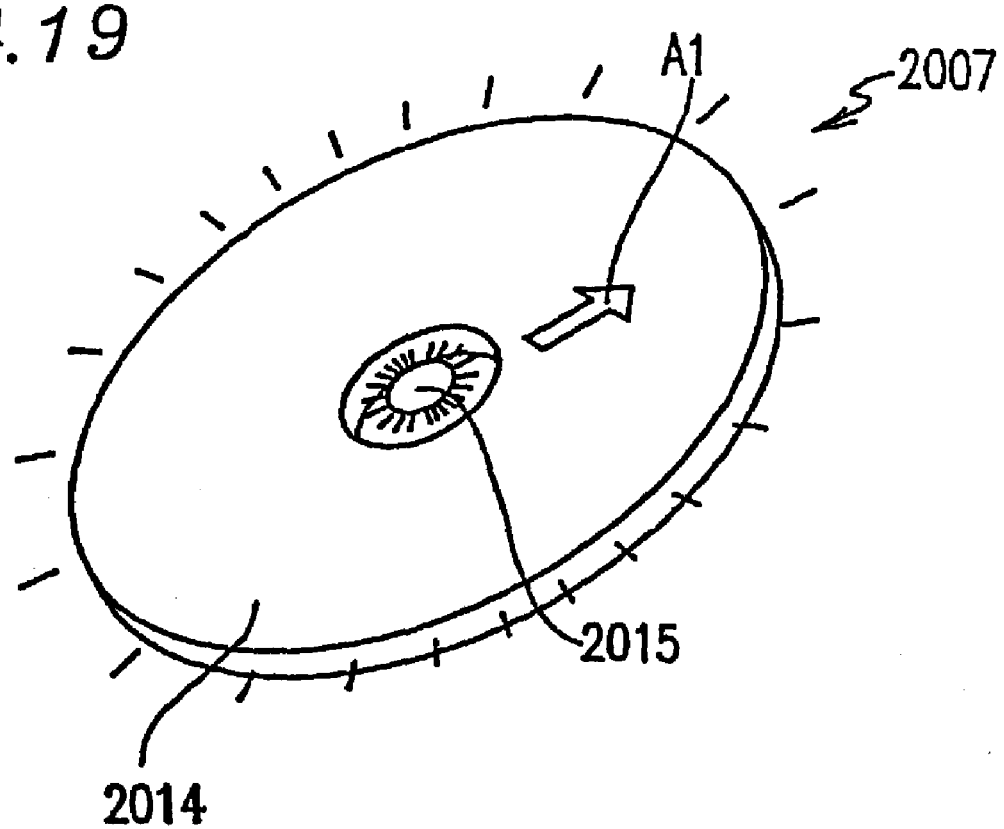
FIG. 19 is an isometric view of light emitting means of the induction-heating cooking device according to the fourth through the sixth examples of the present invention.

FIG. 19 shows the light emitting means 2007 including a donut-shaped light conducting body 2014 and a light source 2015 provided at the center thereof. The light source 2015 is formed of a light bulb or a semiconductor device. When the power switch 2008 is turned on, the light source 2015 at the center is lit up. The light is guided by the light conducting body 2014 to light up the periphery of the light conducting body 2014. The light at the periphery displays a graphic pattern, a circle in the seventh example, on the cooking board 2002. Where the diameter of the light conducting body 2014 is slightly greater than the diameter of the heating coil 2004, a circle can be displayed around the heating section 2003.

Figure 20:
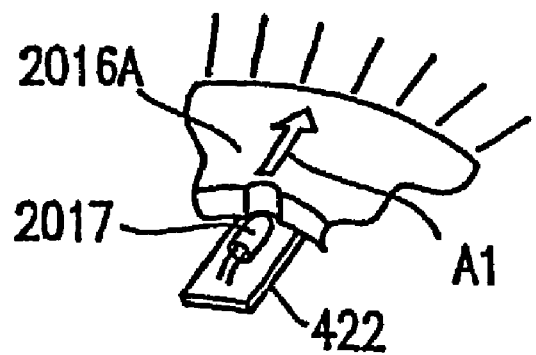
FIG. 20 is an isometric view of another light emitting means of an induction-heating cooking device according to the fourth through the sixth examples of the present invention.

FIG. 20 shows a fan-shaped light conducting body 2016A, which is obtained by dividing the light conducting body 2014 shown in FIG. 19. The fan-shaped light conducting body 2016A and a light source 2017 provided at the pivotal point thereof are provided as one block. By combining such blocks, a semi-circular pattern or other graphic patterns can be displayed.

In the above, the light emitting means 2007 which is circular or having a similar shape is described. Various other shapes such as quadrangular shapes may be obtained by combining a light conducting plate and a light source.

As described above, the seventh example allows the user to easily confirm whether the power is on or not. However, the user sometimes turns the power on but does not use the induction-heating cooking device. In this case, the following method can be used.

When the output setting section 2010 is not operated for a prescribed period of time, for example, 5 minutes, after the power switch 2008 is turned on, the control section 2005 automatically turns off the power switch 2008.

In the structure having two heating sections, when the power switch 2008 is turned on, graphic patterns for both heating sections are displayed. When only one heating section is used and the other heating section is kept unused, the display for the heating section which is not used is turned off after a prescribed period of time. Since the display for the heating section which is used is on, the user can recognize that the power switch for the other heating section is also on.

Alternatively, in the structure having two heating sections, the induction-heating cooking device may be formed such that only the graphic pattern for one heating section is displayed when the power switch 2008 is turned on. In this case also, since the display for one heating section is on, the user can recognize that the power for the other heating section is on.

The induction-heating cooking device may also be formed such that when the power switch 2008 is turned on, no graphic pattern for the heating sections is displayed. The graphic pattern is only displayed when the output setting section (switch for each heating section) 2010 of the heating section to be used is operated. In this case, the heating section in use can be clearly shown.

These techniques save power.

As described above, the seventh example allows the user to easily confirm visually whether the power is turned on or not. This eliminates the trouble of confirming the on/off state of the power.

EXAMPLE 8

The eighth example of the present invention regards a process after the seventh example. When the output setting section 2010 sets an output for cooking using the induction-heating cooking device 1700 shown in FIG. 17, a different graphic pattern is shown on the cooking board 2002 from the graphic pattern used for indicating that the power is on.

When the power switch 2008 is turned on and then the output is set to put the induction-heating cooking device 1700 to a heating state, the display on the cooking board 2002 is changed in accordance with the use state. Specifically, where a circle is displayed on the cooking board 2002, the circle blinks when the power switch 2008 is turned on, and the circle lights up when heating is started. In this manner, the user can easily confirm visually that the power is turned on and that heating is started.

The state may be identified by the color of the display. For example, the display is in blue when the power is turned on, and the color is changed to red when heating is started.

The state may be identified by the darkness of the color of the display. For example, the display is in pale red when the power is turned on, and the color is changed to dark red when heating is started. The display may be changed in accordance with the use state by lighting-up/blinking, colors, and color combinations.

Various use states may be represented by various combinations. For example, the pattern is lit up in blue when the power is turned on, the pattern is lit up in red when heating is started, and the pattern blinks in red when heating is completed.

Such different colors may be realized by using a set of light sources emitting different colors of light, which is controlled by the control section 2005. Alternatively, filters may be used when appropriate. The darkness of the color can be easily changed by changing the output to the light source using the control section 2005.

EXAMPLE 9

The ninth example of the present invention regards a method of utilizing the second output display section 2012 provided on a front area of the cooking board 2002. When the power switch 2008 is turned on, the output display section 2012 blinks. When the output is set, the output display section 2012 is lit up. The second output display section is usually divided into several sections in order to represent the magnitude of the output. The output display section 2012 is lit up over a wide range at the maximum output, but over a narrow range at the minimum output. In order to allow the user to easily confirm the range visually even at the minimum output, the size of the output display section 2012 is preferably slightly larger than actually necessary. The blinking can be performed at the maximum output in order to allow the user to easily confirm the state. When the display is blinking, the display should correspond to the maximum output in order to allow the user to easily confirm.

As in the eighth example, where the state where the heating is completed and the power is still on is represented by lighting up a specific color, the color of light may be blinked to show the proceeding state of cooking. As described above, various combinations may be used to provide various forms of display.

As described above, the ninth example allows the user to easily confirm the proceeding state of cooking.

In the seventh through ninth examples, there are two induction-heating sections. The seventh through ninth examples are applicable to when there is only one induction-heating section or there are three or more induction-heating sections. The embodiments described in the seventh through ninth examples can be easily carried out.

EXAMPLE 10

With reference to a figure, a tenth example of the present invention will be described.

The cooking board used in the present invention may be light-transmissive or non-light transmissive. In the case where the cooking board is non-light transmissive, a portion of the cooking board corresponding to the graphic pattern needs to be light-transmissive. This can be achieved by applying a blackish inorganic paint to a bottom surface of the cooking board formed of light-transmissive glass except for the portion which needs to be light-transmissive. In the tenth example, a light-transmissive cooking board is used.

In the tenth example, a plurality of heating coils having different rated outputs are used. In this example, two heating coils having rated outputs of 2 kW and 3 kW are used. It is assumed that the 2 kW heating coil is provided on the left, and the 3 kW heating coil is provided on the right.

Figure 37:
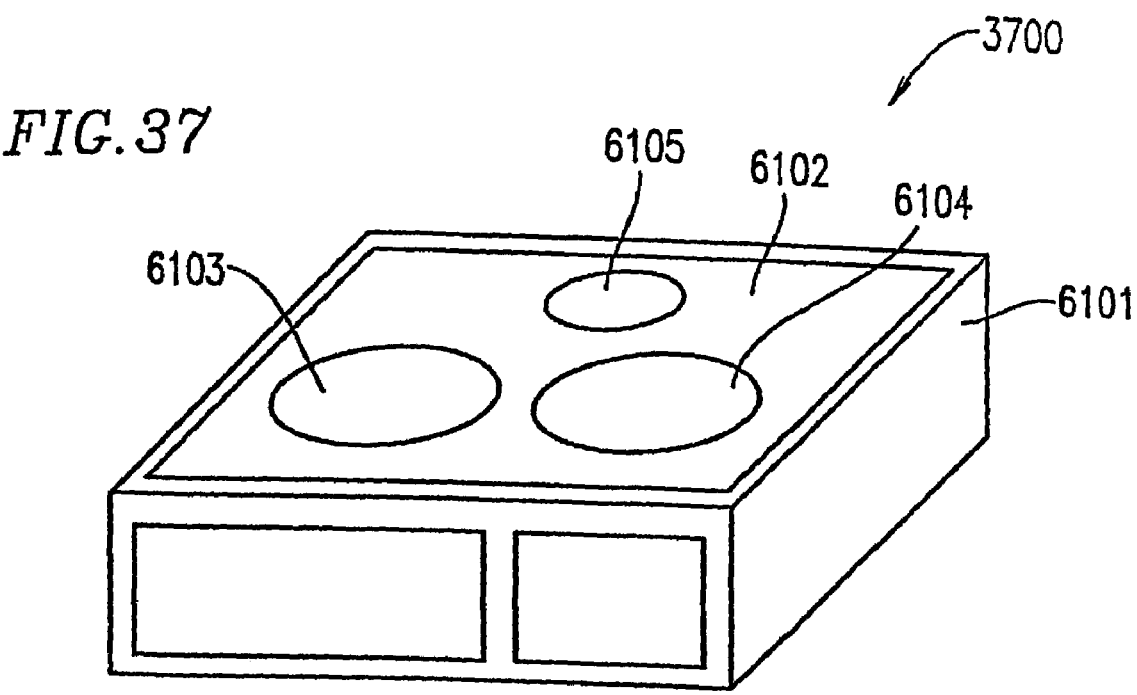
FIG. 37 is an isometric view of another conventional induction-heating cooking device.
Figure 38:
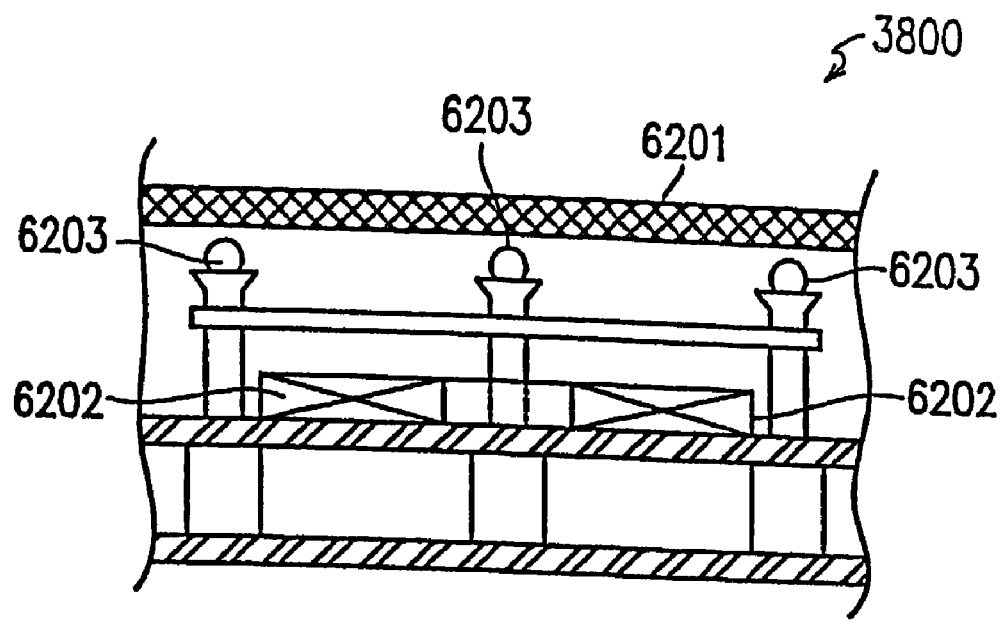
FIG. 38 is a partial cross-sectional view of still another conventional induction-heating cooking device.
Figure 39:
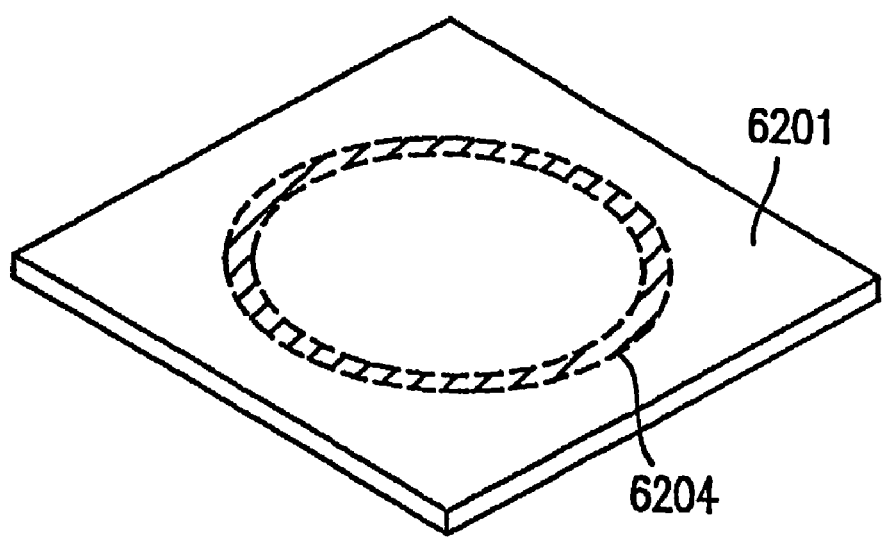
FIG. 39 shows an example of a graphic pattern on still another conventional induction-heating cooking device.
Figure 40:
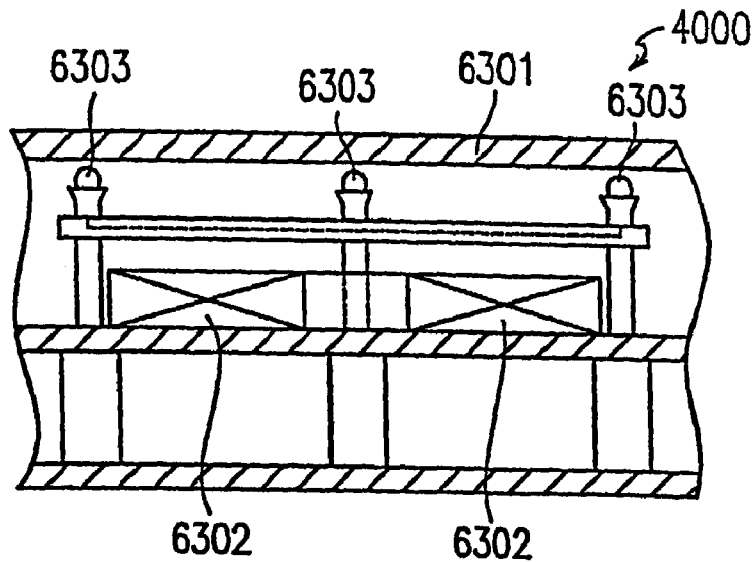
FIG. 40 is a cross-sectional view of still another conventional induction-heating cooking device.
Figure 41:
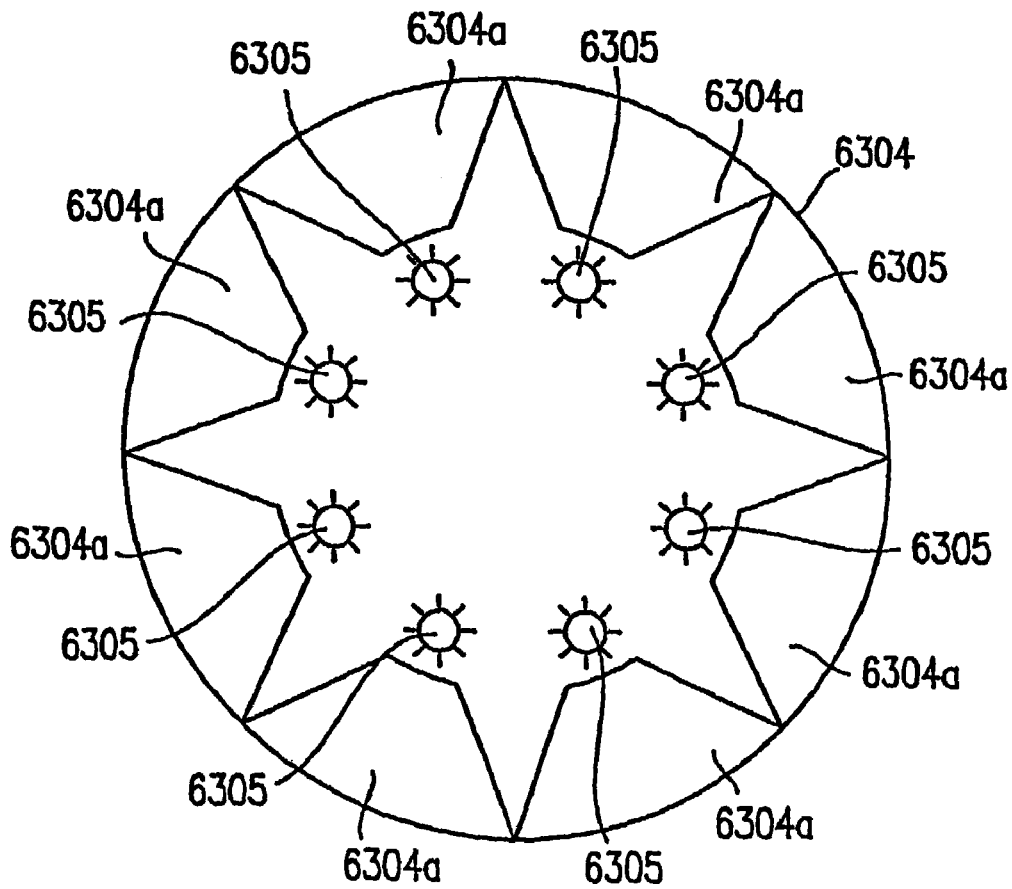
FIG. 41 shows the relationship between a light conducting body and a light source of still another conventional induction-heating cooking device.

The induction-heating cooking device in the tenth example is basically similar to the conventional induction-heating cooking device 3700 shown in FIG. 37, except for the method for displaying the state of the heating sections on the cooking board. Accordingly, identical elements to those in FIG. 37 bear identical reference numerals thereto, and detailed descriptions thereof will be omitted.

The display on the cooking board is provided by the light emitted by the light emitting means located below the cooking board and seen from above the cooking board, which is light-transmissive (i.e., the display means is provided on the cooking board). The graphic pattern substantially matches the structure of the light emitting means. The tenth example is provided in order to clearly describe the method for display, and thus the light emitting means is only described generally.

Figure 21:
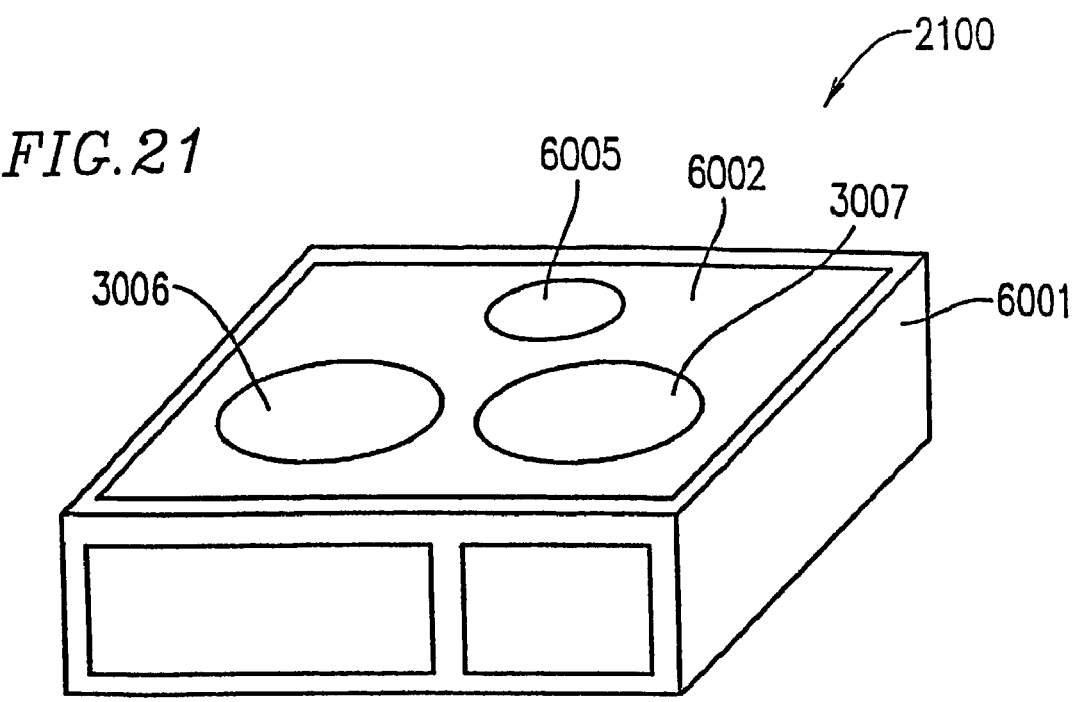
FIG. 21 is an isometric view of an induction-heating cooking device according to a seventh example of the present invention.

FIG. 21 is an isometric view of an induction-heating cooking device 2100 according to the tenth example of the present invention. In FIG. 21, a heating section 3006 on the left corresponds to the 2 kW heating coil. A heating section 3007 on the right corresponds to the 3 kW heating coil. In the tenth example, the different rated outputs are represented by the size of the graphic patterns, i.e., the circles surrounding the heating sections. The radius of the circle corresponding to the rated output of 3 kW is larger than the radius of the circle corresponding to the rated output of 2 kW. Thus, it is easily recognized visually which heating section has a larger output.

In the tenth example, a circle is used as the graphic pattern. Alternatively, a polygon such as a quadrangle surrounding the entirety of the heating section, or a part of a circle or a polygon may be used.

The difference in size of the graphic patterns may be sufficiently large to represent the difference in rated output. Therefore, the graphic patterns need not be sufficiently large to surround the heating section. A graphic pattern which is sufficiently large to surround the heating section is preferable since such a large graphic pattern allows the difference in rated output to be recognized even after the cooking container is placed on the cooking board, while the cooking container is heated or during cooking.

In this example, the graphic patterns surround the heating sections. Since this undesirably raises the cost, the difference may be represented by the difference in lengths of lines. Alternatively, light bulbs of different sizes may be used so as to provide a dot display. However, lines or dots makes it more difficult to recognize the difference than circles or the like surrounding the heating sections.

EXAMPLE 11

Figure 22:
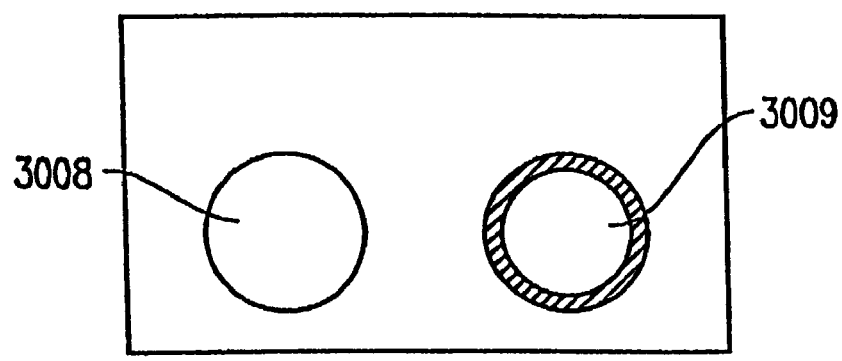
FIG. 22 is a partial plan view of an induction-heating cooking device according to an eighth example of the present invention.

FIG. 22 is a plan view illustrating heating sections 3008 and 3009, which are main parts of an induction-heating cooking device according to an eleventh example of the present invention. In FIG. 22, the width of the circumferential portion of the circle for the heating section 3008 corresponding to the heating coil having a rated output of 2 kW is smaller than the width of the circumferential portion of the circle for the heating section 3009 corresponding to the heating coil having a rated output of 3 kW.

As in the tenth example, the graphic pattern is not limited to a circle. In the case where lines are used for display, the difference in width of the lines allows the user to recognize the difference. In the case where dots are used for display, the difference in size of the dots allows the user to recognize the difference.

The concept of displaying the graphic patterns of the tenth example may be combined with the concept of displaying the graphic patterns of the eleventh example.

EXAMPLE 12

Figure 23:
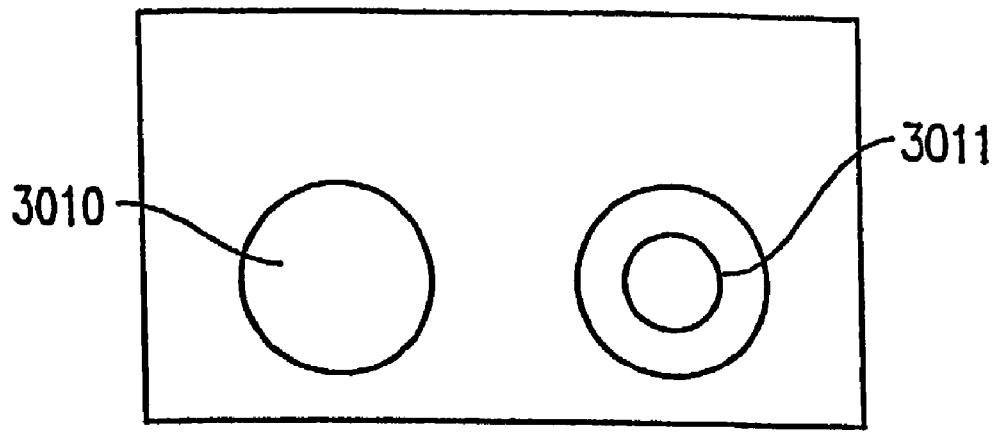
FIG. 23 is a partial plan view of an induction-heating cooking device according to a ninth example of the present invention.

FIG. 23 is a plan view illustrating heating sections 3010 and 3011, which are main parts of an induction-heating cooking device according to a twelfth example of the present invention. In FIG. 23, the heating section 3010 corresponding to a rated output of 2 kW is represented by one circle, and the heating section 3011 corresponding to a rated output of 3 kW is represented by two circles. This allows the user to recognize the difference in output at a glance. In the case where the heating sections are surrounded by polygons, one of the heating sections may be surrounded by one polygon and the other may be surrounded by polygons which are similar to each other and have different sizes. The similar polygons are provided concentrically. When lines or dots are used for display, the user can recognize the difference by the difference in the number of lines or dots.

The concept of displaying the graphic patterns of the twelfth example may be combined with the concept of displaying the graphic patterns of the tenth and/or the eleventh example.

EXAMPLE 13

In the tenth through twelfth examples above, the difference in rated output is represented by the difference in the graphic pattern.

In a thirteenth example, the difference in rated output is represented by the difference in color of the graphic pattern. For example, the heating sections corresponding to different rated outputs are displayed by circles of the same size. The heating section having a rated output of 2 kW is represented by blue, and the heating section having a rated output of 3 kW is represented by red. Different levels of darkness of the same color may also be used. For example, the heating section having a rated output of 2 kW is represented by pale red, and the heating section having a rated output of 3 kW is represented by dark red.

The display can be colored by using a color light source obtained by coloring an outer cover of a rod-shaped heating element such as a light bulb or a fluorescent lamp, or by using a filter. Thus, desired colors or desired levels of darkness can be selected.

Figure 24:
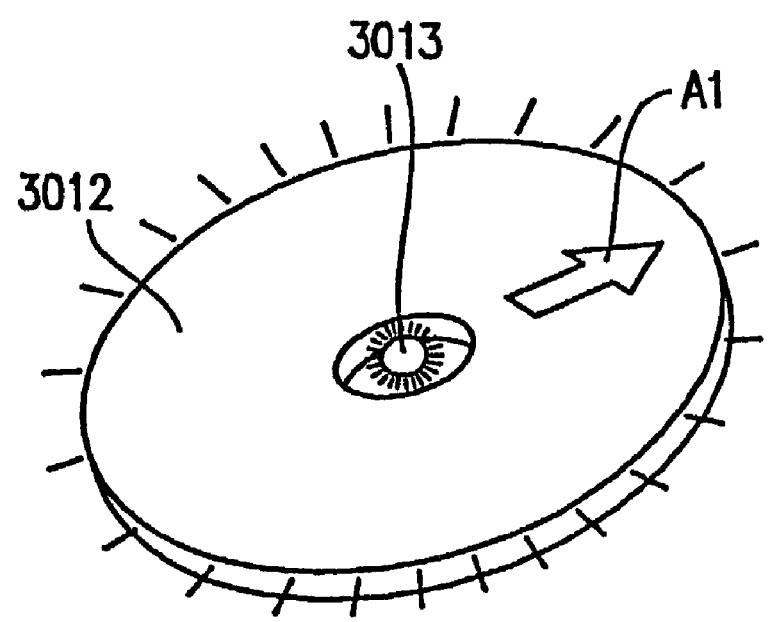
FIG. 24 shows an example of light emitting means of an induction-heating cooking device according to a tenth example of the present invention.

A pattern surrounding a heating section such as a circle can be colored as shown in FIG. 24. A color light source, obtained by coloring an outer cover of annular light emitting means such as a fluorescent lamp, is provided as light emitting means 3013 at the center of a donut-shaped light conducting plate 3012. The light emitted by the light emitting means 3013 is guided by the light conducting plate 3012 so as to light up the periphery of the light conducting plate 3012 in an annular form. Thus, a circle can be displayed on the cooking board. At this point, a color light source can be used as the light source. Alternatively, a color light conducting plate may be used as the light conducting plate 3012. Still alternatively, a lighting paint which is lit up when irradiated with light is applied to the bottom surface of the cooking board in advance, and the lighting paint is lit up.

EXAMPLE 14

In the tenth through thirteenth examples, a graphic pattern is displayed for each of the heating sections having different rated outputs. In a fourteenth example, where there are two induction-heating sections, the state of one of the sections is displayed. The graphic pattern can be displayed in accordance with the tenth through thirteenth examples.

As described in the tenth through fourteenth examples, the difference in rated output can be represented by various shapes or colors of graphic patterns. The patterns are not limited to those described in the tenth through fourteenth examples. The shape of the pattern can be appropriately altered by combinations of dots, straight lines, circles, polygons, parts of circles or polygons, and colors. For example, whereas a heating section having a rated output of 2 kW is represented by a circle, a heating section having a rated output of 3 kW may be represented by a circle having a larger radius, a wider circumferential portion and a different color. In this case, an inner portion of the heating section may be used as a plane, and the difference can be represented by the difference in light intensity of planar emission.

As described above, the present invention provides light emitting means below a cooking board and displays the light obtained by the light emitting means on the cooking board. There are other methods for displaying a graphic pattern on the cooking board and representing the difference. In the case where a graphic pattern is provided on the bottom surface of the cooking board, the user looks at reflected light of the light incident from the top surface of the cooking board. Such reflected light is undesirably difficult to see due to the large thickness of the cooking board. When a graphic pattern is provided on the top surface of the cooking board, abrasion caused by the friction with the cooking container needs to be considered.

In the above examples, there are two heating sections. There can be more than two heating sections. The effect of the present invention increases as the number of the heating sections is greater and there is a larger difference among rated outputs of the heating sections.

In the above, the rated outputs are 2 kW and 3 kW. The present invention is not limited to such rated outputs. The rated outputs maybe smaller or larger. A heating section having a larger output may be provided on the left and a heating section having a smaller output may be provided on the right.

An induction-heating cooking device generally includes temperature sensing means and control means. Utilizing these, the graphic pattern according to the present invention may be lit up during cooking and blinked after cooking until the temperature of the cooking board is lowered down to a safe level. Functions such as "no pan", "frying" and the like may be represented by different forms of display.

EXAMPLE 14

With reference to figures a fourteenth example of the present invention will be described.

An outer peripheral portion of a heating coil in the sense of the present invention refers the light conducting body which is outside the heating coil, but does not refer to the position in the height direction. In the fourteenth example, the light conducting body will be described as being provided below the heating coil.

Figure 25:
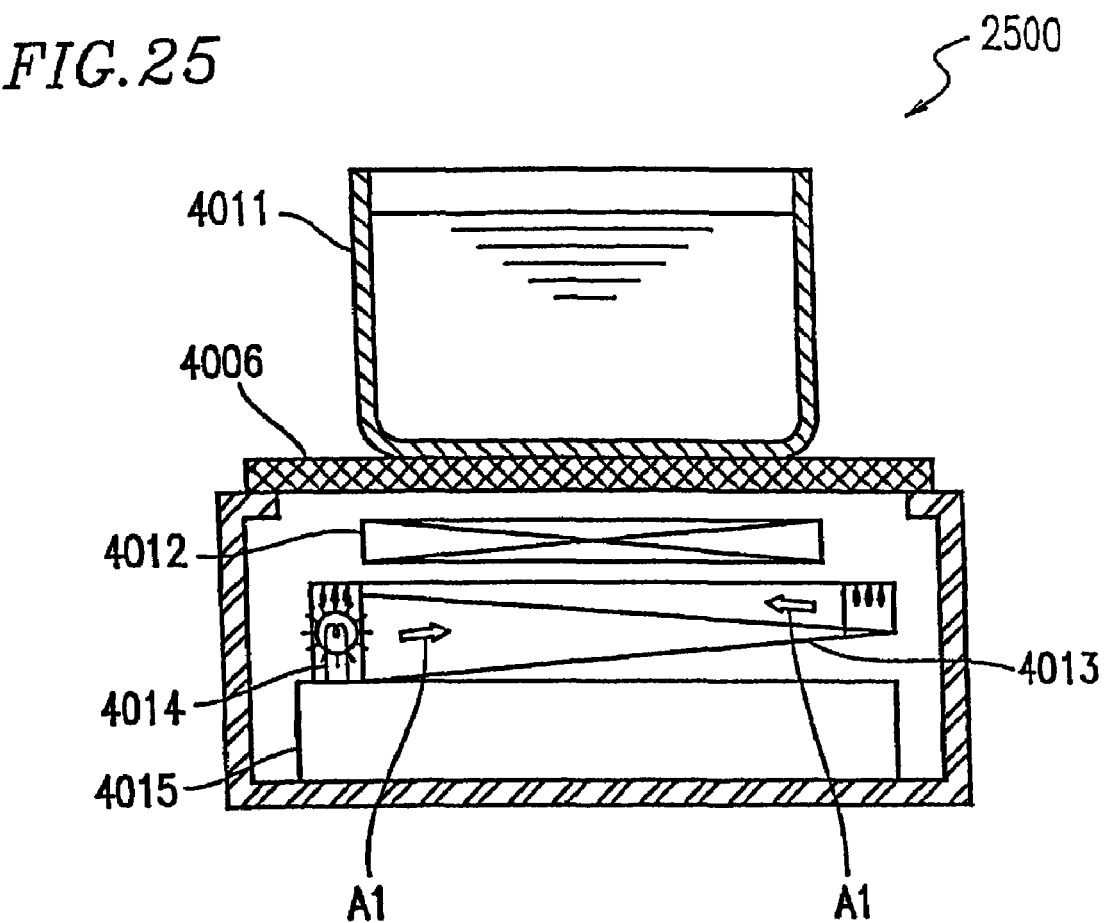
FIG. 25 is a partial cross-sectional view of an induction-heating cooking device according to an eleventh example of the present invention.
Figure 26:
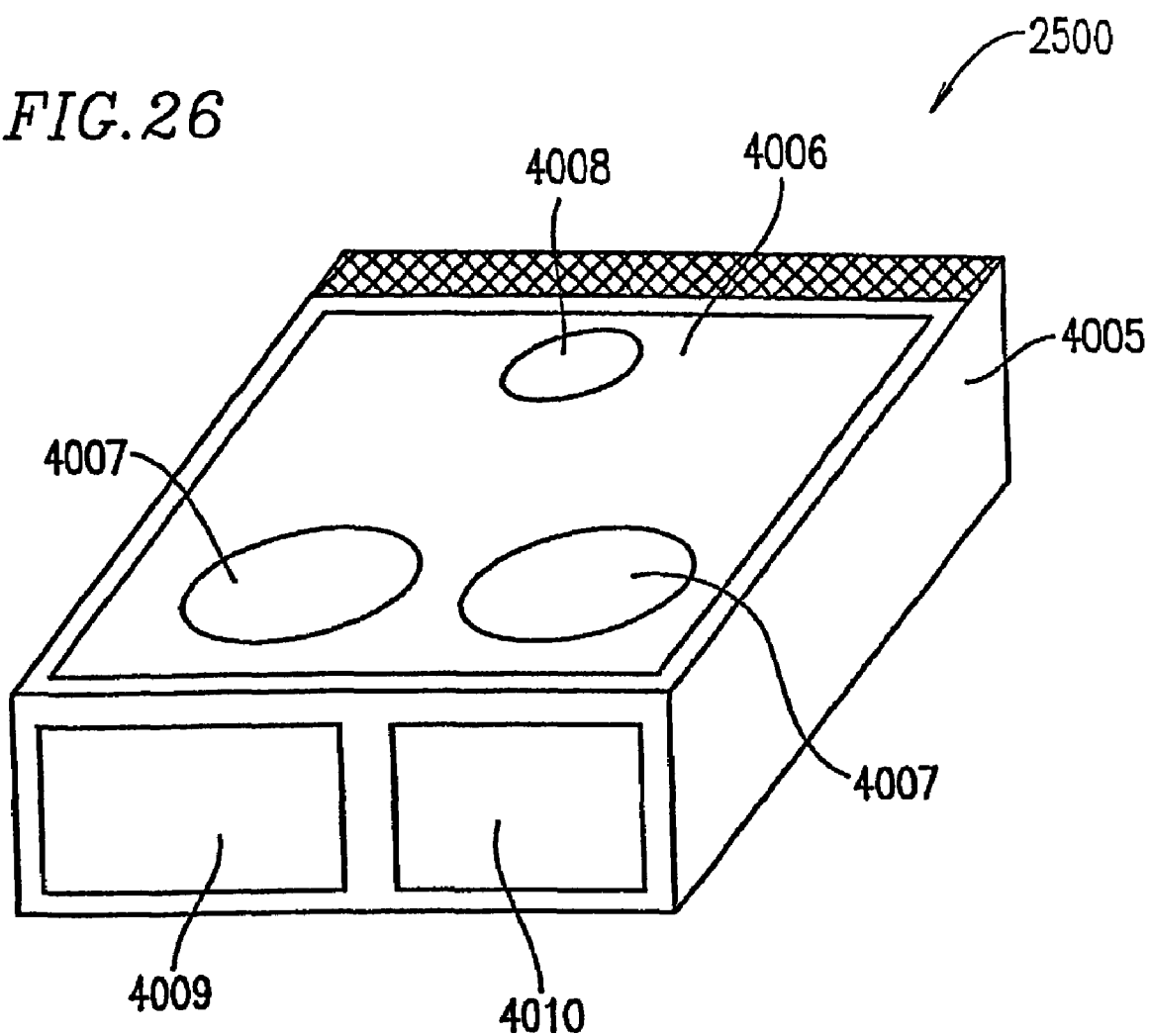
FIG. 26 is an external isometric view of the induction-heating cooking device according to the eleventh example of the present invention.

FIG. 26 is an isometric view of an induction-heating cooking device 2500 according to the fourteenth example of the present invention. As shown in FIG. 25, a light-transmissive cooking board 4006 is provided on a top surface of a main body case 4005. The cooking board 4006 has a heating section 4007 for heating a pan by induction heating so as to cook food and a radiation heater 4008 for cooking using a pan which cannot be used for induction heating. A roaster 4009 and an operation section 4010 are provided on a front side surface of the main body case 4005.

FIG. 25 is a partial cross-sectional view illustrating a cross-section taken along one of the two directions. In FIG. 25, a cooking pan 4011 is placed on the heating section 4007 (FIG. 26) of the cooking board 4006. In order to heat the cooking pan 4011, a heating coil 4012 is provided at a position below the cooking board 4006 corresponding to the heating section 4007 (FIG. 26), i.e., a cooking pan. A light conducting body 4013 is provided below the heating coil 4012. By forming the light conducting body 4013 so as to have a size substantially covering the entirety of the heating coil 4012 including an outer peripheral portion thereof, the light from the light conducting body 4013 reaches the cooking board 4006 without being shielded by the heating coil 4012. Thus, the area of the heating section 4007 can be clearly displayed on the cooking board 4006. As the light conducting body 4013, a material having a superb light transmittance such as an acrylic resin, a polycarbonate resin or glass is used. Reference numeral 4014 represents a light source formed of a light bulb or an LED (semiconductor light emitting device). Light emitted by the light source 4014 is propagated through the light conducting body 4013. Reference numeral 4015 represents a control section for, for example, adjusting the heating power for cooking or controlling the light source 4014 to blink.

Figure 27:
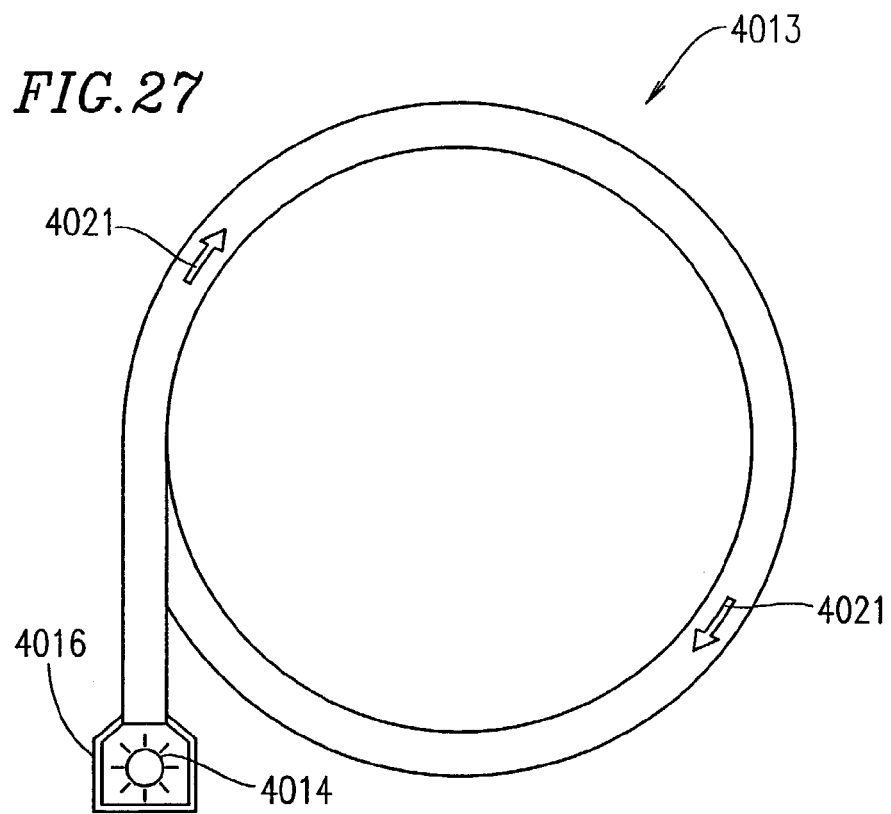
FIG. 27 is a plan view of light emitting means of the induction-heating cooking device according to the eleventh example of the present invention.

FIG. 27 is a plan view illustrating a structure of light emitting means including a light conducting body and a light source as one set, which is one feature of the present invention.

In FIG. 27, the light conducting body 4013 is circular and donut-shaped in correspondence with the circular heating coil 4012 (FIG. 25). The inner diameter of the light conducting body 4013 is slightly larger than the outer diameter of the heating coil 4012. The cross-section in a direction vertical to the optical path of the light conducting body 4013 may be circular, quadrangular or of a similar shape. The light conducting body 4013 is generally easily obtained by resin molding.

A light source chamber 4016 is provided at a position of the light conducting body 4013 at which light is incident. In the fourteenth example, one light bulb is provided as a light source 4014 in the light source chamber 4016. The light source chamber 4016 is surrounded by a reflective plate so as to prevent light from being released to a direction other than toward the light conducting body 4013. Light emitted by the light source 4014 advances straight or propagates while being reflected in repetition inside the light conducting body 4013 as shown by arrow 4021. During the propagation, the light is released toward the cooking board 4006, and the intensity of the light is attenuated. In this manner, the light is released toward the cooking board 4006 while propagating in the light conducting body 4013. Therefore, a graphic pattern having the same shape as that of the top surface of the light conducting body 4013 is displayed on the cooking board 4006. In FIG. 27, a circle is displayed.

When the light is released in a direction other than toward the cooking board 4006 during the propagation, the intensity of the light is attenuated. In order to restrict this, the light conducting body 4013 is provided with a reflective layer in a portion other than the portion through which the light is released toward the cooking board 4006. The reflective layer may be formed of a metal foil or plate formed of aluminum or stainless steel, or may be formed by vapor deposition or sputtering of a metal material or a metal oxide material. Alternatively, the reflective layer may be formed by painting or chemical methods. Regardless of the technique, provision of the reflective layer can restrict the release of the light in directions other than toward the cooking board 4006 and thus can restrict the attenuation of light.

Figure 28:
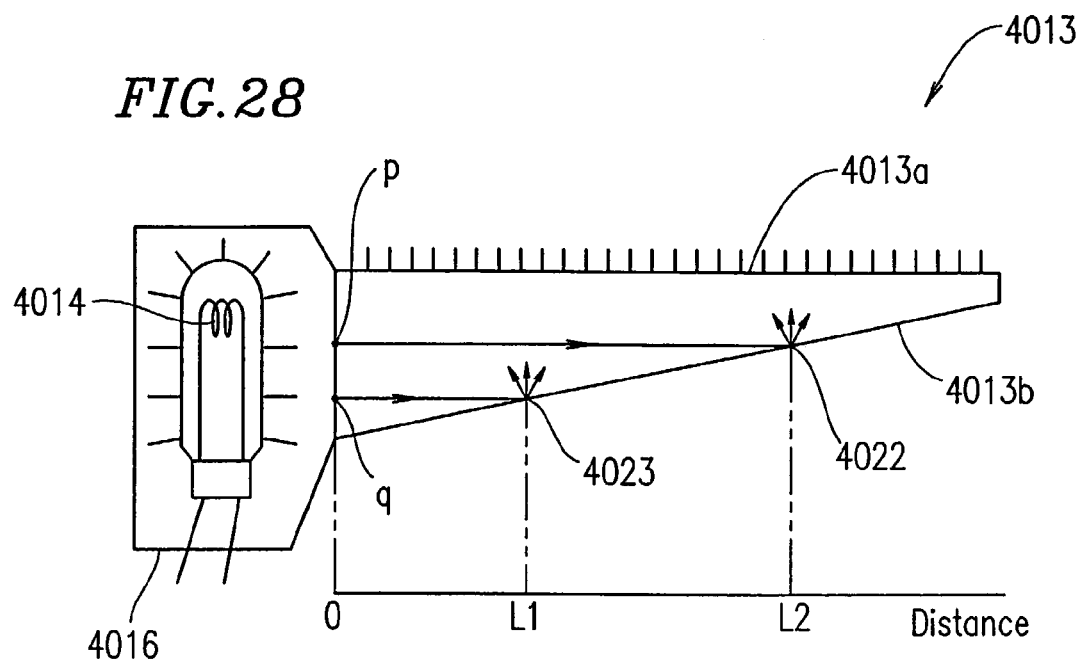
FIG. 28 is a developed view of light conducting body of the induction-heating cooking device according to the eleventh example of the present invention.

FIG. 28 is a developed view of the light conducting body 4013 obtained by resin molding. FIG. 28 illustrates the structure of the light conducting body for uniformizing the light released toward the cooking board 4006. For example, FIG. 27 shows the light conducting body 4013 obtained by rolling the light conducting body 4013 having a shape shown in FIG. 28 into a circle. As shown in FIG. 28, the light conducting body 4013 is horizontal in an upper portion 4013a from which light is released, and is inclined in a lower portion 4013b for reflecting the light. As shown in FIG. 28, the distance between the lower portion 4013b for reflecting light and the upper portion 4013a for releasing light becomes gradually shorter as it becomes further from the light source 4014. Thus, light incident at point p which is not much distanced from the upper portion 4013a encounters, and is reflected by, the lower portion 4013b at a position 4022 which is away from the light source 4014 by distance L2. Then, the light is directed toward the upper portion 4013a. Light which is incident at point q which is more distanced from the upper portion 4013a encounters, and is reflected by, the lower portion 4013b at a position 4023 which is away from the light source 4014 by distance L1. Then, the light is directed toward the upper portion 4013a. In this manner, the light can be uniformly released from the upper portion 4013a of the light conducting body 4013. A graphic pattern having a uniform light intensity can be provided on the cooking board 4006.

Next, a method for providing a reflective layer on the lower portion 4013b of the light conducting body will be described. A random reflective layer, which is a type of reflective layer, is provided by mechanically polishing the surface of the lower portion 4013b so as to form convex and concave portions. Alternatively, chemical etching may be used. When etching does not provide sufficient convex and concave portions, masking can be used in combination. While the light conducting body 4013 is formed by resin molding, the lower portion 4013b may be formed so as to have fine convex and concave portions. The convex and concave portions may be provided by causing the same type or a different type of substance to adhere to the surface of the lower portion 4013b by spraying or the like. By causing metal powder or the like to adhere to the convex and concave surface obtained in this manner, a random reflective layer is provided. When light is incident on the random reflective layer, the light is diffused and reflected in various directions. Thus, uniformity in light is easily obtained.

A mirror reflective layer can be formed as follows, for example. A metal powder layer is provided on the lower portion 4013b of the light conducting body by vapor deposition, sputtering or painting, as described above. Alternatively, a metal foil or a plate is bonded to the lower portion 4013b of the light conducting body. When the lower portion 4013b is inclined, the resultant mirror reflective layer is especially effective for uniformizing the light from the upper portion 4013a.

When the lower portion 4013b is inclined, a great number of continuous sawtooth-shaped prisms may be provided on a surface of the lower portion 4013b during resin molding. The incident light is reflected by the prisms, and thus the light is released from the upper portion 4013a. In this manner also, uniformity in light is obtained.

A light reflective layer may also be provided by covering the light conducting body 4013 with a substance having a smaller refractive index than that of light. Then, the light is subjected to total reflection at the interface of the light conducting body 4013 and the substance.

In the fourteenth example, light incident from the light source 4014 is caused to light up the entirety of the light conducting body 4013. A graphic pattern having a dark portion and a pale portion can be displayed on the cooking board 4006 as follows. In order to partially change the reflectance of the lower portion 4013b of the light conducting body 4013, the roughness of the lower portion 4013b is partially changed. Alternatively, in the case where the lower portion 4013b is inclined, the gradient is partially changed so as to partially change the reflectance.

In the case where the outer periphery of the heating coil is too long, the intensity of the light emitted by the light source may undesirably be excessively reduced at a position far from the light source if there is only one light source. In this case, a light source and a semicircular light conducting body are formed as one unit, and two such units may be used. The number of units may be increased as necessary.

In the fourteenth example described above, the light conducting body has a circular outer appearance. As described above, the light conducting body maybe quadrangular, circular or of a similar shape. The light conducting body is preferably circular for the following reason. Since the heating coil is usually circular, a circular light conducting body clarifies the position of the heating coil, i.e., the position of the heating section. In addition, a circular light conducting body is highly stable.

In the above description, a graphic pattern is provided over a position corresponding to the entire periphery of the heating coil. When necessary, a graphic pattern is provided over a position corresponding to a half or a part of the entire periphery of the heating coil.

As described above, the fourteenth example realizes a clear, continuous graphic pattern provided over the entirety of the cooking board, instead of dots or lines. Since only a minimum amount of light sources is required, the production cost can be low.

EXAMPLE 15

With reference to figures, a fifteenth example of the present invention will be described.

Figure 30:
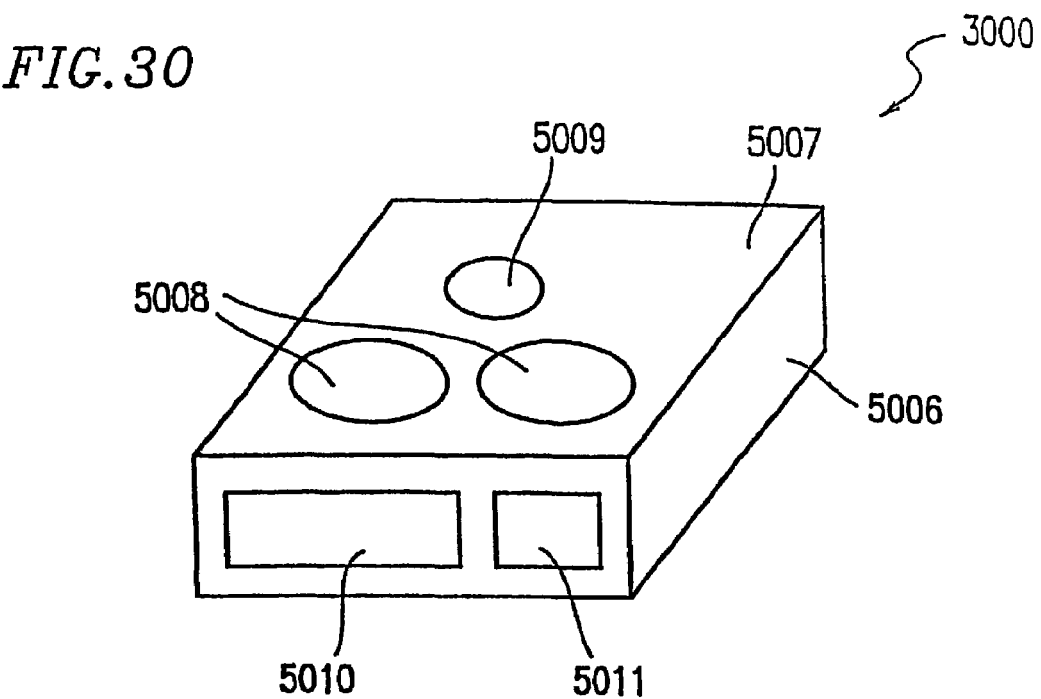
FIG. 30 is an external isometric view of the induction-heating cooking device according to the twelfth example of the present invention.

FIG. 30 is an isometric view of an induction-heating cooking device 3000 used in the fifteenth example of the present invention. As shown in FIG. 30, a light-transmissive cooking board 5007 is provided on a top surface of a main body case 5006. The cooking board 5007 has a heating section 5008 for heating a pan by induction heating so as to cook food and a radiation heater 5009 for cooking using a pan which cannot be used for induction heating. A roaster 5010 and an operation section 5011 are provided on a front side surface of the main body case 5006.

Figure 31:
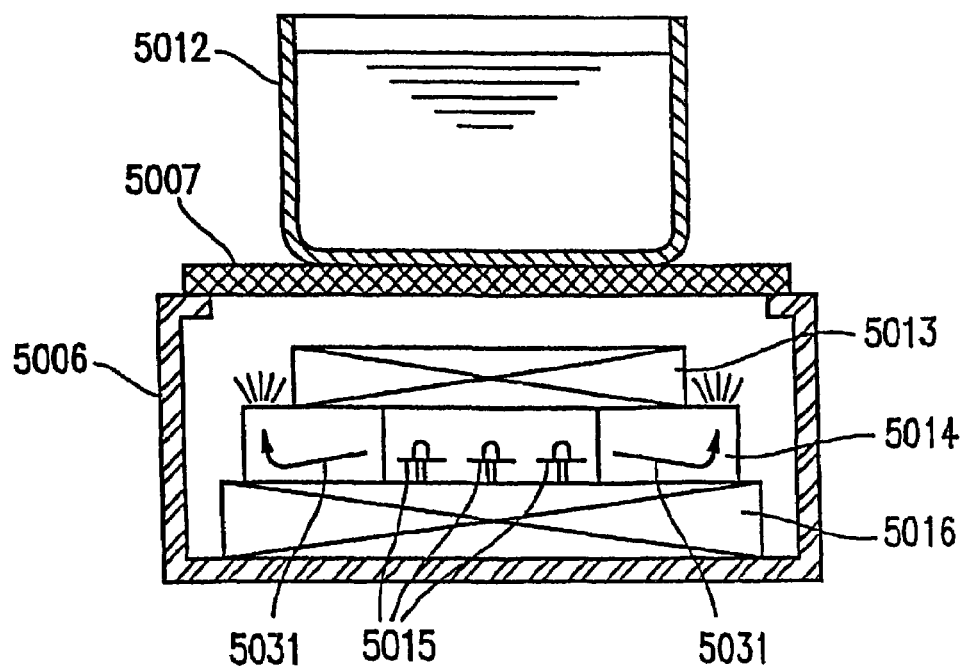
FIG. 31 is a partial cross-sectional view of the induction-heating cooking device according to the twelfth example of the present invention.

FIG. 31 is a partial cross-sectional view illustrating a cross-section taken along one of the two directions. In FIG. 31, a cooking pan 5012 is placed on the heating section 5008 (FIG. 30) of the cooking board 5007. In order to heat the cooking pan 5012, a heating coil 5013 is provided at a position below the cooking board 5007 corresponding to the heating section 5008, i.e., a cooking pan. A light conducting body 5014 is provided below the heating coil 5013. By forming the light conducting body 5014 so as to have a size substantially covering the entirety of the heating coil 5013 including an outer peripheral portion thereof, the light from the light conducting body 5014 reaches the cooking board 5007 without being shielded by the heating coil 5013. Thus, the area of the heating section 5008 can be clearly displayed on the cooking board 5007. As the light conducting body 5014, a material having a superb light transmittance such as an acrylic resin, a polycarbonate resin or glass is used. Reference numeral 5015 represents alight source formed of a light bulb or an LED (semiconductor light emitting device). Light emitted by the light source 5015 is propagated through the light conducting body 5014 and is directed toward the cooking board 5007 at the outer peripheral portion of the light conducting body 5014. Reference numeral 5016 represents a control section for, for example, adjusting the heating power for cooking or controlling the light source 5015 to blink.

FIG. 29(*a*) is a wiring diagram illustrating a two-system light source structure as one example of a multiple-system light source structure, which is one feature of the present invention. The two-system light source structure shown in FIG. 29(*a*) includes a system 5018A including six light sources 5015*a* and a power supply 5017*a* therefor, and a system 5018B including six light sources 5015*b* and a power supply 5017*b* therefor. The power supplies for the light sources may be DC or AC power supplies. FIG. 29(*b*) shows exemplary graphic patterns provided on the cooking board 5007 respectively by the light sources 5015*a* and the light sources 5015*b*. A graphic pattern 5019*a* is provided by the system 5018A, and a graphic pattern 5019*b* is provided by the system 5018B. In FIG. 29(*b*), a clear border 5032 is provided between the system 5018A and the system 5018B. The systems 5018A and 5018B may be designed so as to have the clear border 5032 therebetween or overlap each other.

In FIG. 29, when, for example, one of the light sources 5015*a* malfunctions, the system 5018A is turned off. In this state, the user can recognize that the system 5018A malfunctions. Since the system 5018B is lit up, the user can visually recognize that the induction-heating cooking device is now heated. In the structure in which the system 5018A and the system 5018B are blinking simultaneously or alternately, the user can visually recognize more easily that the induction-heating cooking device is now heated.

Figure 32:
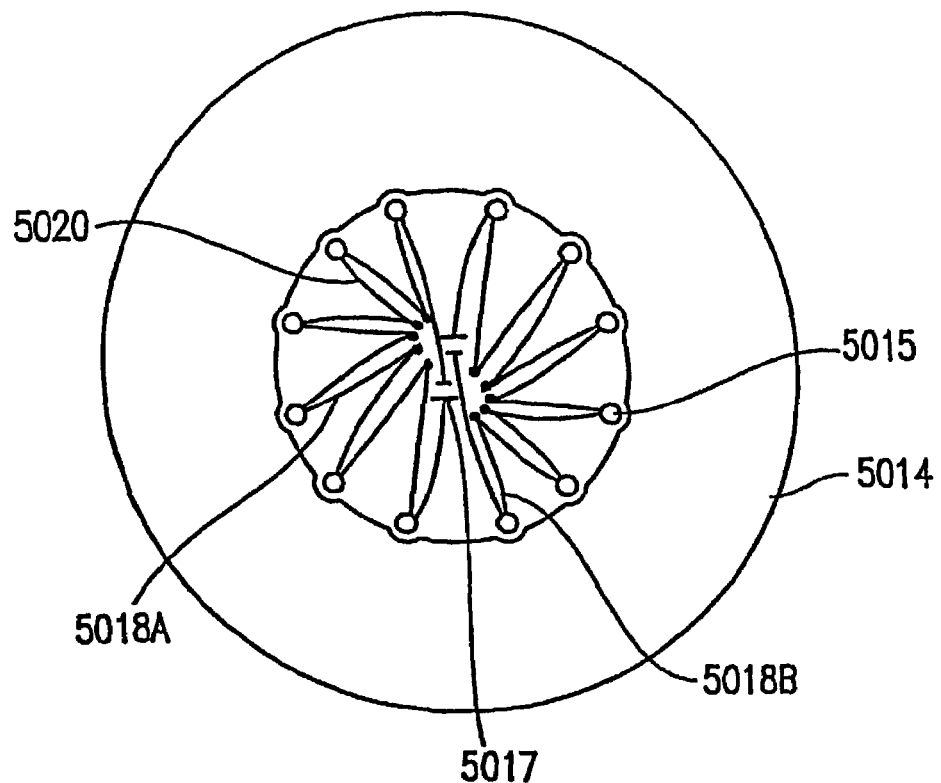
FIG. 32 shows the relationship between a light conducting body and a light source of the induction-heating cooking device according to the twelfth example of the present invention.

With reference to FIG. 32, the relationship between the light conducting body 5014 and the light source 5015 will be described. In FIG. 32, the conducting body 5014 is circularly annular, and a plurality of light sources 5015 are provided in a circularly annular manner at the center of the conducting body 5014. In FIG. 32, 12 light sources 5015 are used. Six light sources on the left are connected in series so as to form the system 5018A, and the six light sources on the right are connected in series so as to form the system 5018B. Each system is provided as a block. By providing a plurality of light sources in this manner, light is provided uniformly from the outer periphery of the circularly annular light conducting body 5014. Thus, a circular graphic pattern is displayed on the cooking board.

The method of connection of lead sections 5020 of the light sources 5014 is not specifically limited. In FIG. 32, the lead sections 5020 of the light sources are arranged radially from the center of the circle. This is for reducing the malfunction and heat generation caused by a magnetic field at the time of induction heating. The lead sections 5020 of the light sources 5015 may be leads or patterns on a substrate.

Figure 33:
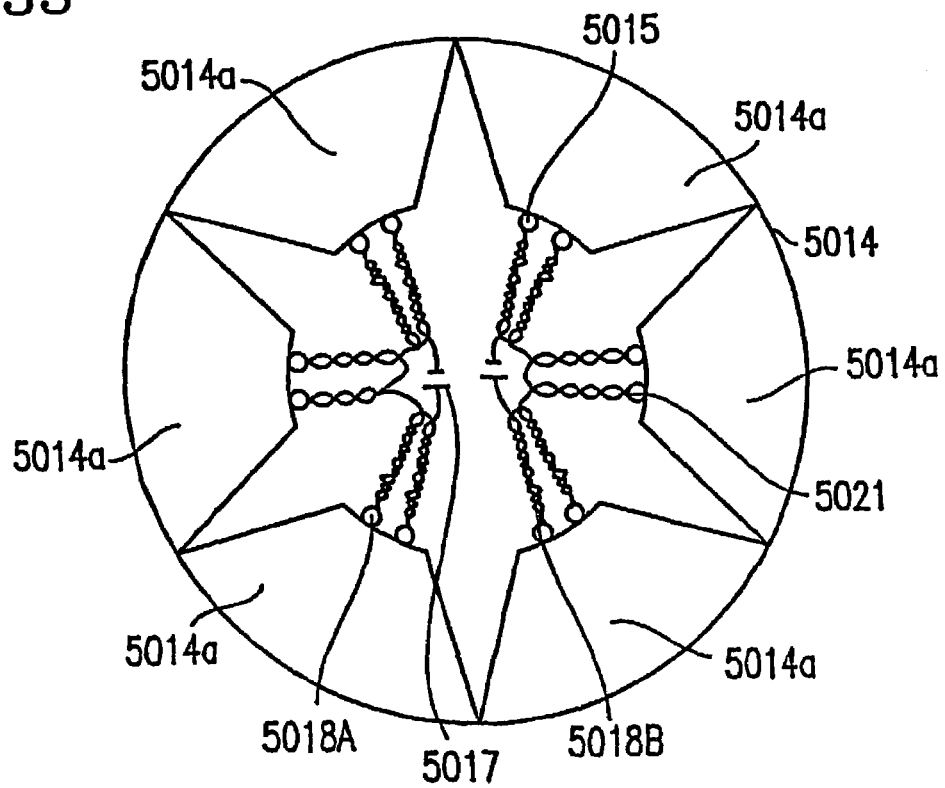
FIG. 33 shows the relationship between another light conducting body and a light source of the induction-heating cooking device according to the twelfth example of the present invention.

FIG. 33 illustrates another example showing the relationship between the light conducting body 5014 and the light sources 5015. In FIG. 33, the light conducting body 5014 is divided into a plurality of light conducting body pieces 5014*a*. A light conducting body piece 5014*a* and at least two light sources 5015 are formed as one block. A plurality of such blocks are assembled. In FIG. 33, a circularly annular structure is formed of six blocks. By combining the light conducting body piece 5014*a* and the light sources 5015 in this manner, various graphic pattern can be obtained. In FIG. 33, 12 light sources 5015 are used, and are connected in the same manner as in FIG. 32. Lead sections 5021 of the light sources 5015 are arranged radially from the center of the circle. The example in FIG. 33 is different from the example shown in FIG. 32 in that the leads sections 5021 of the light sources 5015 are twisted in FIG. 33. By this arrangement, the influence of the magnetic field can further be reduced as compared to the example in FIG. 32. The lead sections 5021 of the light sources 5015 may be leads or patterns on a substrate.

Providing the lead sections radially, or twisting and providing the lead sections radially, is not related to the shape of the light conducting body. For example, the lead sections maybe twisted in FIG. 32. The lead sections are arranged in such manners for the purpose of preventing the influence of the magnetic field at the time of induction heating as described above. For this purpose, such arrangements may be used for any of the induction-heating cooking devices.

Figure 34:
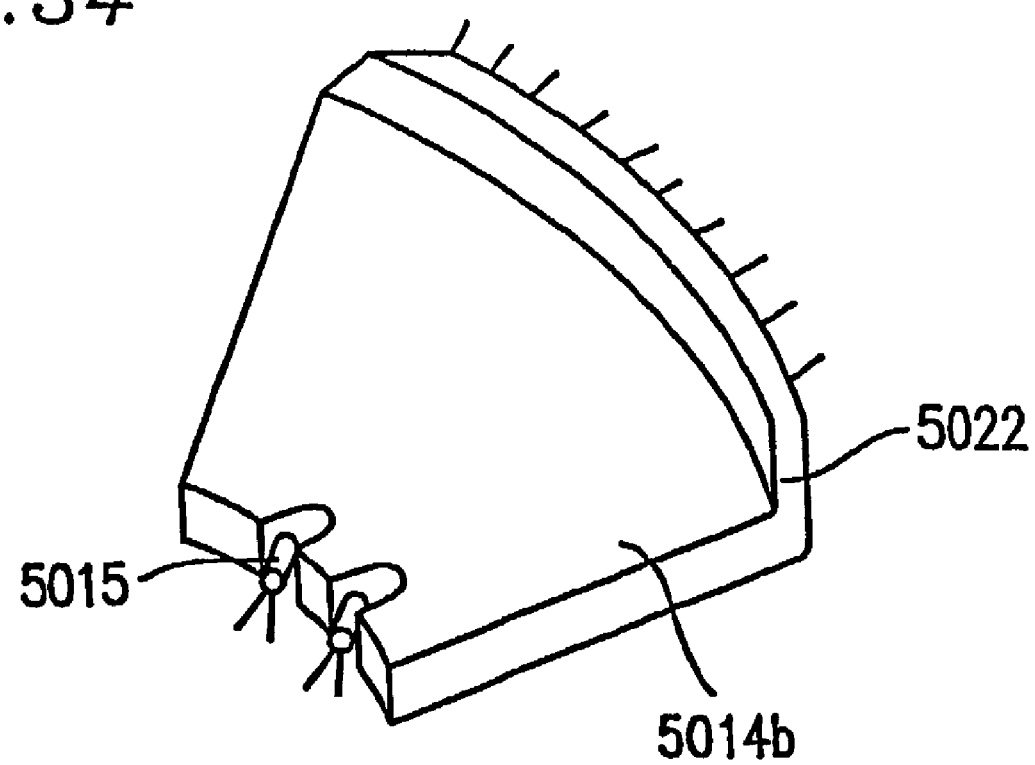
FIG. 34 shows an isometric view illustrating one example of a light conducting body piece of the induction-heating cooking device according to the twelfth example of the present invention.
Figure 36:
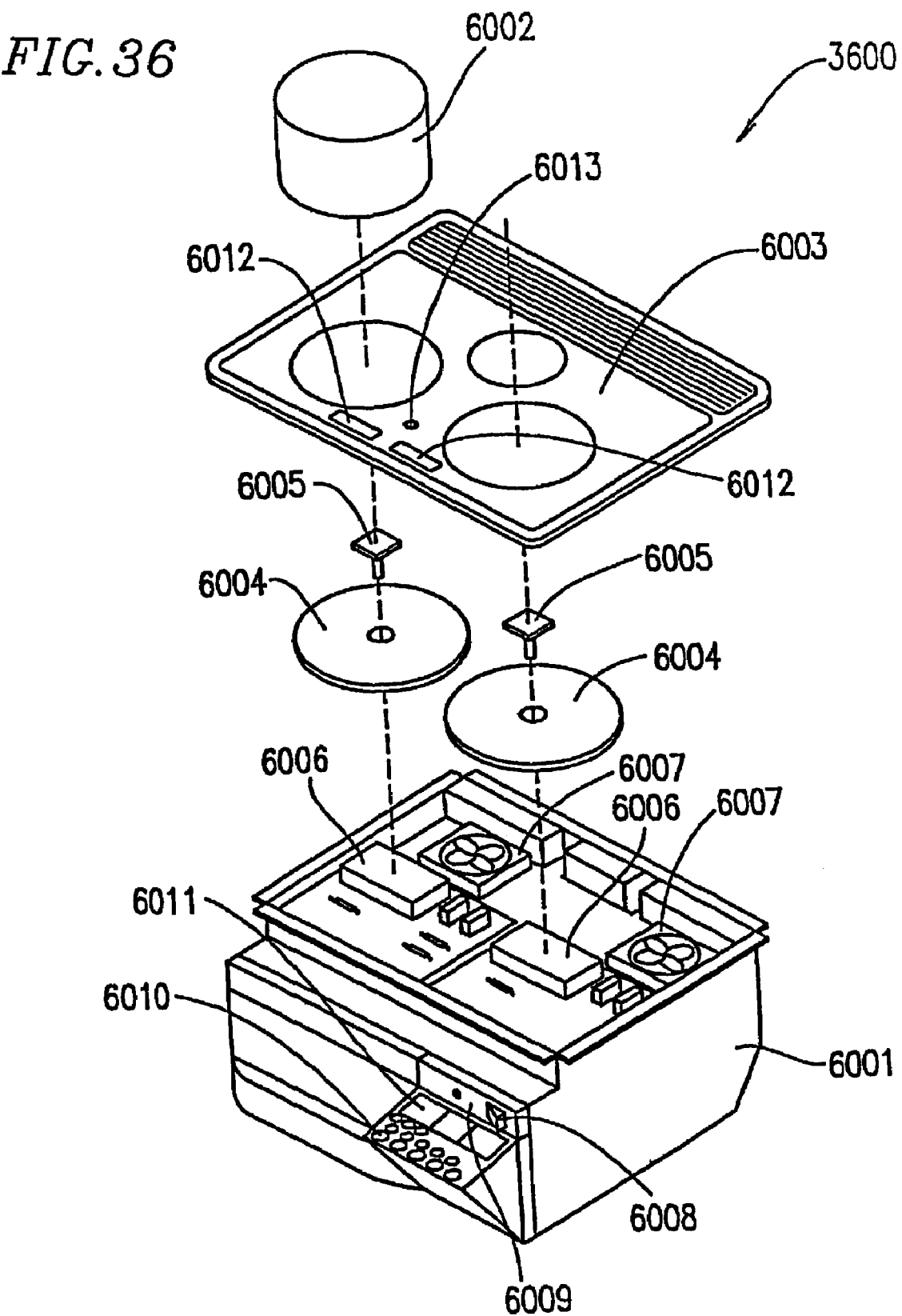
FIG. 36 is an isometric view of a conventional induction-heating cooking device.

In FIGS. 33 and 34, the light conducting body 5014 is circularly annular. The present invention is not limited to this. The light conducting body 5014 may assume any shape as long as it is annular (substantially ring-shaped).

FIG. 34 shows still another example of the light conducting body (5014*b*). The light conducting body 5014*b* has a wall 5022 around the outer periphery thereof, which extends vertically to the cooking board 5007 (FIG. 30). This can increase the intensity of light directed to the cooking board 5007.

EXAMPLE 16

With reference to FIGS. 35(*a*) and 35(*b*), a sixteenth example of the present invention will be described. The sixteenth example is different from the fifteenth example in the manner of connecting a plurality of light sources. The other parts of the sixteenth example are the same as those of the fifteenth example and thus will not be described.

FIG. 35(*a*) is a wiring diagram of a plurality of light sources in the sixteenth example. Unlike in the fifteenth example, the light sources 5015*a* of the system 5018A and the light sources 5015*b* of the system 5018B are alternately provided, and both systems use six light sources. FIG. 35(*b*) shows exemplary graphic patterns provided on the cooking board 5007 respectively by the light sources 5015*a* and the light sources 5015*b*. A graphic pattern 5023*a* on the left in FIG. 35(b) is provided by a light source section 5022a on the left of FIG. 35(a), and a graphic pattern 5023b on the right of FIG. 35(b) is provided by a light source section 5022b on the right of FIG. 35(a). The graphic patterns 5023a and 5023b may be designed so as to have the clear border therebetween or overlap each other.

In FIGS. 35(a) and 35(b), when, for example, one of the light sources 5015a malfunctions, the system 5018A is turned off. In this state, the user can recognize that a malfunction occurs since the color of the display becomes lighter. Since the system 5018B is lit up, the user can visually recognize that the induction-heating cooking device is now heated although the display is lighter.

In the structure in which the system 5018A and the system 5018B are blinking simultaneously or alternately, the user can visually recognize more easily that the induction-heating cooking device is now heated. By providing the light sources 5015a and 5015b in different colors, for example, blue and red, the difference in heating power can be represented. The induction-heating cooking device may also be structured such that during the initial stage of heating, one of the systems is lit up, and as the heating proceeds, both systems are lit up. Various other manners of display can be provided by adding blinking patterns.

Next, the relationship between the light conducting body 5014 and the light source 5015 will be described. The relationship in the sixteenth example is similar to that in the fifteenth example. The light sources 5015 may be provided alternately, with the rest being the same as in FIGS. 32 and 33.

In the fifteenth and sixteenth examples, the light sources are provided in two systems. Three or more systems may be provided. In the case where three or more systems are used and are lit up sequentially, the light moves as if flowing. This provides a good appearance. However, practically, the number of systems should be about three system or less. When the number of systems is increased, the connection becomes complicated. When a large number of light sources are used, the cost is undesirably raised.

INDUSTRIAL APPLICABILITY

As is clear from the above-described examples, the present invention provides a lit-up display on the cooking board representing a heating state. Accordingly, the display which is visually separated from the cooking section in a conventional apparatus can be provided in the vicinity of the cooking section. Thus, the induction-heating cooking device can be used in a similar manner to that of a gas cooking device.

According to the present invention, the light conducting means and the light emitting means are provided below the heating coil. Owing to such a structure, discoloring, deformation or the like of the light conducting means caused by radiation, conductance or transmission from the cooking container or the like can be prevented. The light emitting means formed of a light bulb, a semiconductor device or the like can prevent, for example, malfunction caused by the influence of the strong magnetic field or reduction in reliability due to self-heat generation. Reduction in the luminous intensity or the like due to a temperature rise of a semiconductor device or the like used for the light emitting means can be prevented. The light beam from the light emitting means can be prevented from leaking to an area immediately above the light emitting means.

According to the present invention, the light conducting means is disc-shaped and has an opening at the center thereof. The light emitting means is provided in the opening of the light conducting means. Owing to such a structure, a display which is uniform in luminous intensity can be provided. The display is provided in a shape similar to the shape of the heating area, which is usually circular, and the cooking container, which is usually cylindrical. Thus, the effect of visual recognizability is further improved.

According to the present invention, the thickness of the light conducting means is greatest in an inner portion and decreases toward an outer portion. Reflection means is provided on a top surface or a bottom surface of the light conducting means. Owing to such a structure, the loss of the light beam at the time of incidence is reduced. The reflective plate reduces the loss of the light beam during propagation. Therefore, a display having a higher luminous intensity with less loss can be efficiently provided.

According to the present invention, the light conducting means has an illumination surface at an outer peripheral end thereof. Owing to such a structure, the propagated light is subjected to total reflection so as to guide the light beam toward the cooking board, i.e., a cooking surface. Thus, the visual recognizability can be further improved.

According to the present invention, reflection means is provided parallel to the illumination surface provided at the outer peripheral end of the light conducting means. Thus, the loss of the light beam caused at the time of total reflection due to dispersion during production can be reduced.

According to the present invention, a wall is provided on a top surface of the light conducting means so as to guide the light beam toward the cooking board. The light beam is randomly reflected or diffused by the top surface of the wall. Owing to such a structure, the display can be provided at a position closer to the cooking board, which improves the visual recognizability. The random reflection allows the display to be visually recognizable from various angles.

According to the present invention, a concave surface facing the light emitting means is provided at a border section of the light conducting means, on which the light from the light emitting means is incident. Owing to such a structure, the refraction angle can be larger than the angle of incidence. Thus, even when light emitting means having a small directivity angle is used, a highly luminous, wide range display can be provided. Furthermore, the number of the light emitting means can be reduced, and thus a low cost device can be provided. Since the light beam emitted by the light emitting means is propagated from an inner portion to an outer portion of the light conducting means, a display which is uniform in luminous intensity can be provided.

According to the present invention, the light conducting means is fixed to a coil base. Owing to such a structure, the position of the display provided by the light conducting means with respect to the position of the heating area can be restricted. This prevents reduction in the thermal efficiency and non-uniformity of the thermal distribution. Since the light beam emitted by the light emitting means is propagated from an inner portion to an outer portion of the light conducting means, a display which is uniform in luminous intensity can be provided.

According to the present invention, the light conducting means also acts as the coil base. Owing to such a structure, the position of the display provided by the light conducting means with respect to the position of the heating area can be restricted. Since the light beam emitted by the light emitting means is propagated from an inner portion to an outer portion of the light conducting means, a display which is uniform in luminous intensity can be provided.

According to the present invention, the light emitting means is fixed to the light conducting means. Owing to such a structure, the position of the light conducting means on which light is incident can be restricted. Thus, the loss of the light beam at the time of incidence can be minimized. Since the light emitting means is provided so as to emit light in the same direction as the light propagation direction, the loss of the light beam can be further reduced. Since the light beam emitted by the light emitting means is propagated from the center to an outer portion of the light conducting means, a display which is uniform in luminous intensity can be provided.

According to the present invention, reduction in the luminous intensity of the semiconductor device used for the light emitting means, and discoloring, deformation and the like of the resin used for the light conducting means can be prevented from occurring due to thermal influences caused by radiation, conductance or transmission from the cooking container or thermal influences caused by self-heat generation of the heating coil. Since the light beam emitted by the light emitting means is propagated from the center to an outer portion of the light conducting means, a display which is uniform in luminous intensity can be provided.

According to the present invention, a plurality of blocks of the light conducting means are combined so as to obtain a space. Thus, the cooling performance can be improved. Blocks each including the light conducting means and the light emitting means are used. Therefore, repairing can be easily and rapidly performed by replacing the block which malfunctions. The repairing cost or the like can be low, and thus the user can obtain better service. Since the light beam emitted by the light emitting means is propagated from the center to an outer portion of the light conducting means, a display which is uniform in luminous intensity can be provided.

According to the present invention, when the power is turned on, a graphic pattern is displayed on the cooking board in the vicinity of the heating section. Thus, it is easy to visually recognize that the power is on. The graphic pattern which is displayed when the power is on changes its form when heating starts. Therefore, the state where the power is on can be easily distinguished from the state where the heating is being performed.

According to the present invention, different rated outputs of the heating coils can be displayed by different graphic patterns provided on the cooking board by the light emitting means. Thus, visual recognition of the difference in the rated outputs can be easily done. Since an appropriate heating section is selected in accordance with the type or amount of cooking, appropriate cooking can be performed.

According to the present invention, a light source is combined with a light conducting body for receiving the light from the light source and lighting up a part or the entirety of the outer periphery of the heating coil. Owing to such a structure, a clear continuous graphic pattern can be displayed on the cooking board. Therefore, visual recognition of the heating state can be easily performed. Since the number of the light sources is minimized, the productivity and cost can be improved.

According to the present invention, a plurality of light sources can be divided into two systems, and the systems are arranged parallel to each other. Even when one system malfunctions, the other system allows the heating state to be visually recognized. Such a two-system structure also increases the freedom in combining different forms of display, using blinking or the like.

The invention claimed is:

1. An induction-heating cooking device, comprising:
   a light-transmissive cooking board on which a cooking container to be heated is to be placed;
   a heating coil for heating the cooking container;
   light emission means for emitting a light beam; and
   light-transmissive light conducting means for allowing the light beam emitted by the light emission means to be propagated therethrough,
   wherein:
   the light conducting means is plate-like and guides the light beam from the light emission means toward an outer peripheral portion of the light conducting means,
   the light beam lights up an outer peripheral portion of the light conducting means,
   the light conducting means includes a wall extending vertically toward the cooking board from an outer peripheral end thereof, and
   the light beam is directed from the top surface of the wall toward the cooking board.

2. An induction-heating cooking device according to claim 1, wherein the light emission means and the cooking board are provided oppositely to each other with respect to the heating coil.

3. An induction-heating cooking device, comprising:
   a light-transmissive cooking board provided on a top surface of a main body case;
   a heating section provided on the cooking board for heating a cooking container placed thereon by induction heating;
   a heating coil provided oppositely to the cooking container with respect to the cooking board, the heating coil being provided in correspondence with the heating section;
   a plurality of first light sources and a plurality of second light sources for emitting light beams; and
   a light conducting body for guiding the light beams emitted by the plurality of first light sources and the plurality of second light sources and outputting the light beam in an annular form at a position corresponding to an outer peripheral portion of the heating coil,
   wherein the plurality of first light sources and the plurality of second light sources are connected parallel to each other.

4. An induction-heating cooking device according to claim 3, wherein the plurality of first light sources and the plurality of second light sources are connected in the form of blocks.

5. An induction-heating cooking device according to claim 3, wherein:
   the light conducting body includes a plurality of light conductive body pieces, and
   a plurality of blocks, each including the light conducting body piece and at least two light sources, are combined.

6. An induction-heating cooking device according to claim 3, wherein:
   the light conducting body includes a wall extending vertically toward the cooking board from an outer peripheral end thereof, and
   the light beams are directed from the top surface of the wall toward the cooking board.

7. An induction-heating cooking device according to claim 3, further comprising a plurality of third light sources for emitting light beams,
   wherein the plurality of first light sources, the plurality of second light sources, and the plurality of third light sources sequentially blink.

8. An induction-heating cooking device according to claim 3, further comprising lead sections for connecting the plurality of first light sources,
   wherein the lead sections are provided radially around a center of the light conducting body.

9. An induction-heating cooking device according to claim 8, wherein each of the lead sections is twisted.

10. An induction-heating cooking device according to claim 1, wherein the light emission means and the light conducting means are provided below the heating coil.

* * * * *